July 12, 1960 W. G. WHEELER ET AL 2,944,449
PRESSURE WELDING APPARATUS
Filed April 9, 1957 19 Sheets-Sheet 4
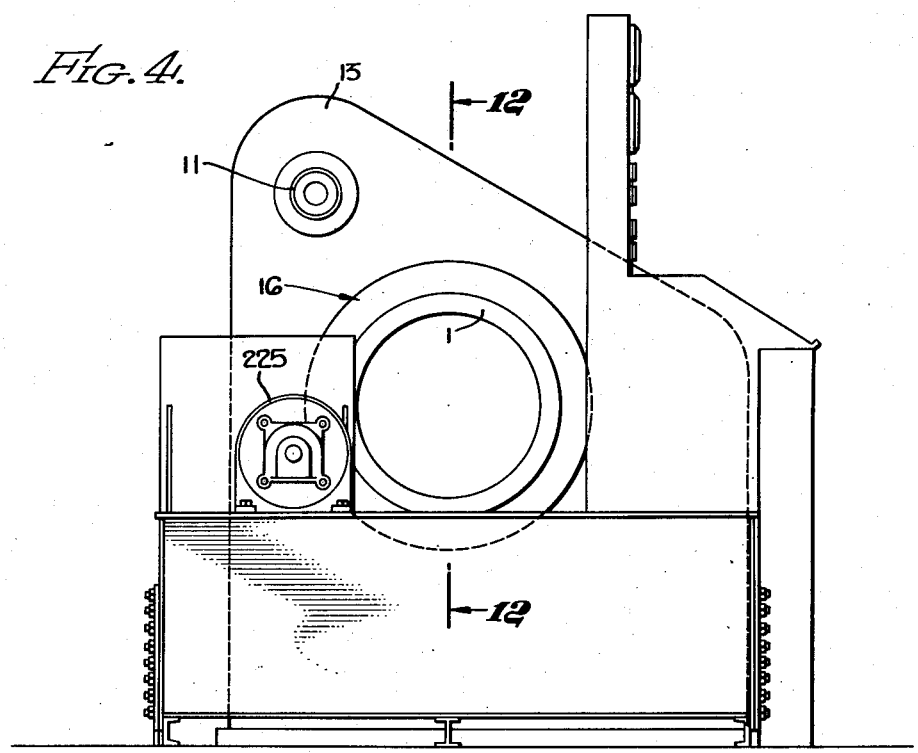
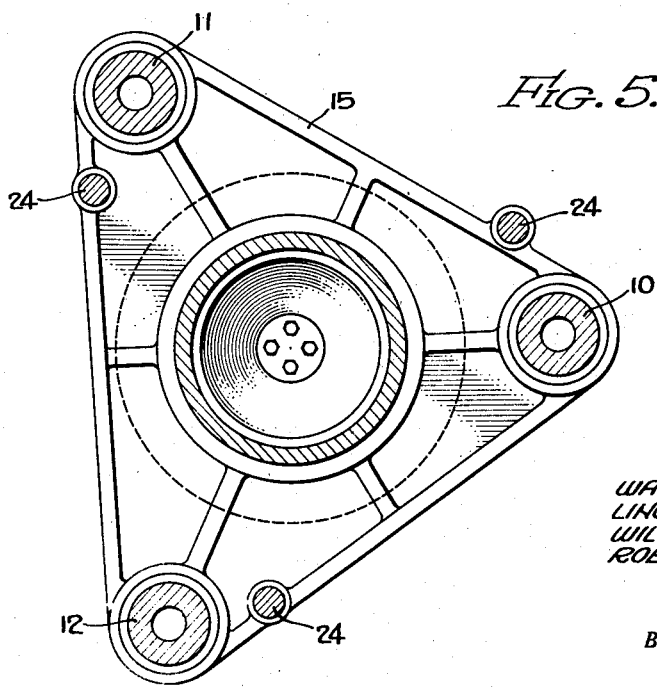
WALTER G. WHEELER
LINCOLN VAN CAMP
WILBUR G. WOOD
ROBERT A. LAWSON
INVENTORS
BY Lyon & Lyon
ATTORNEYS

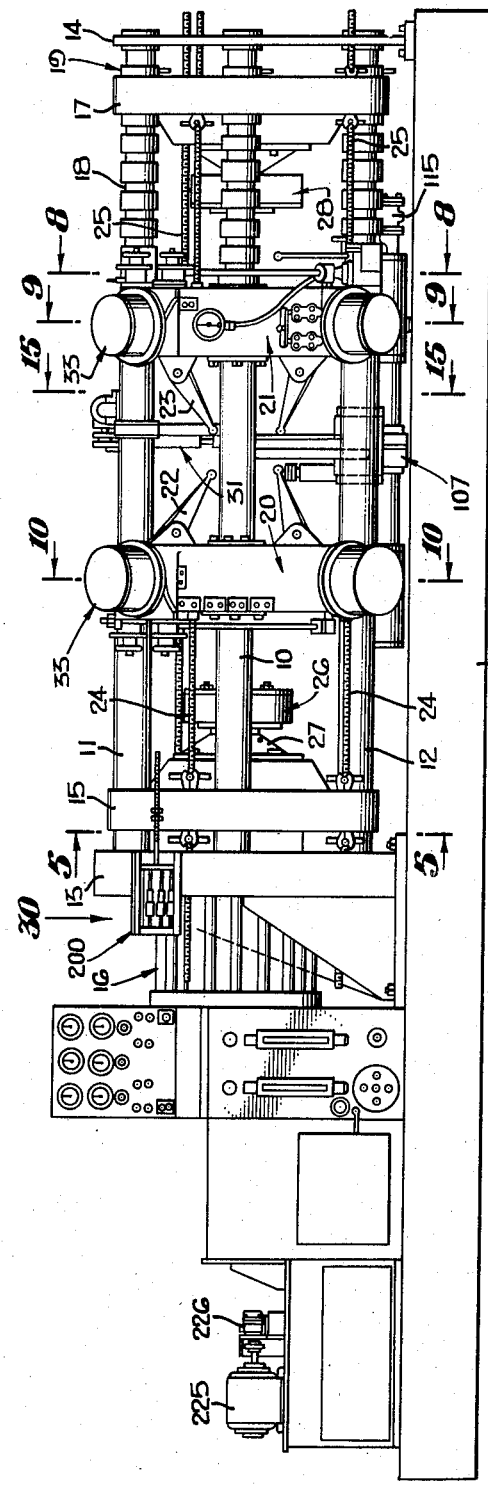

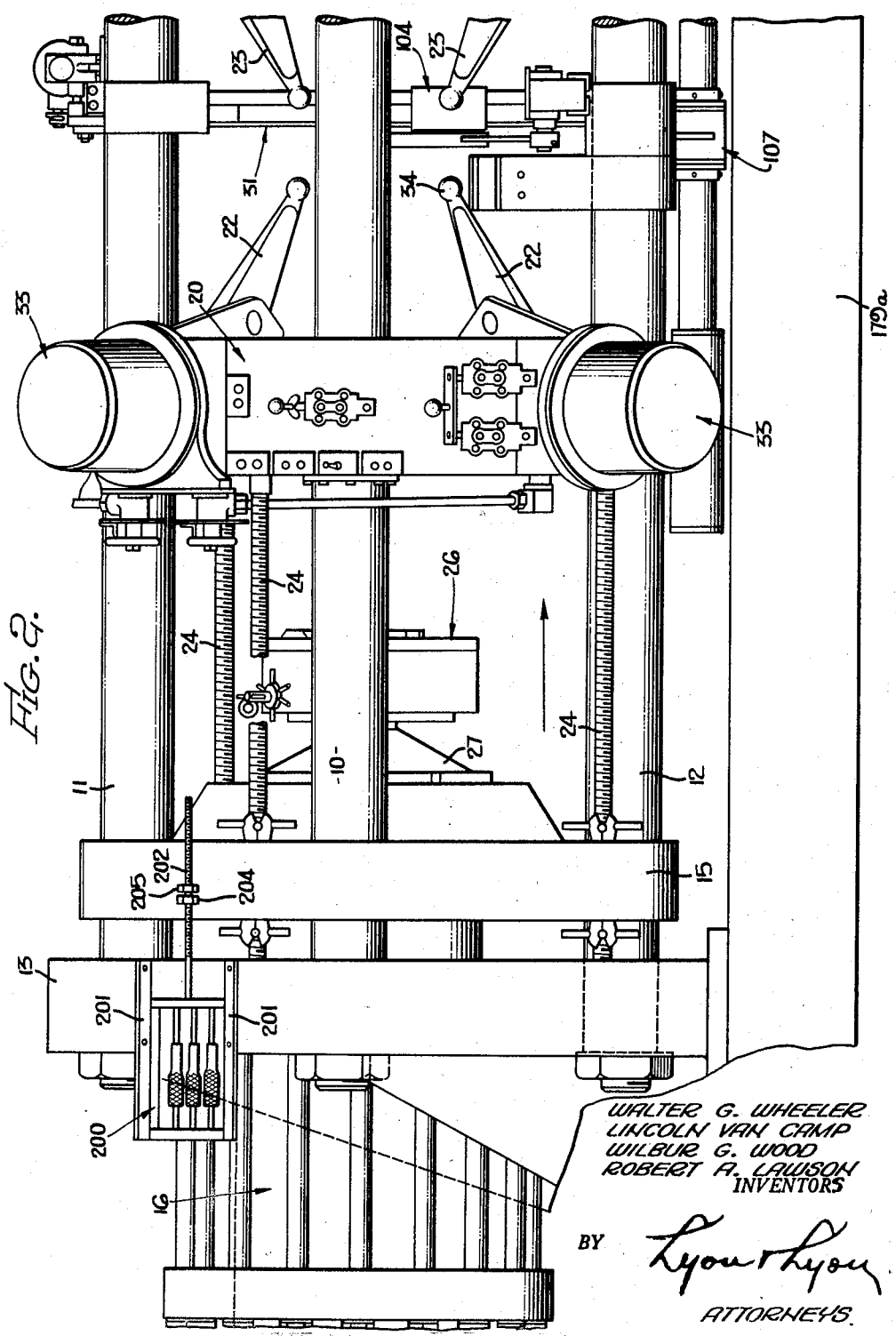

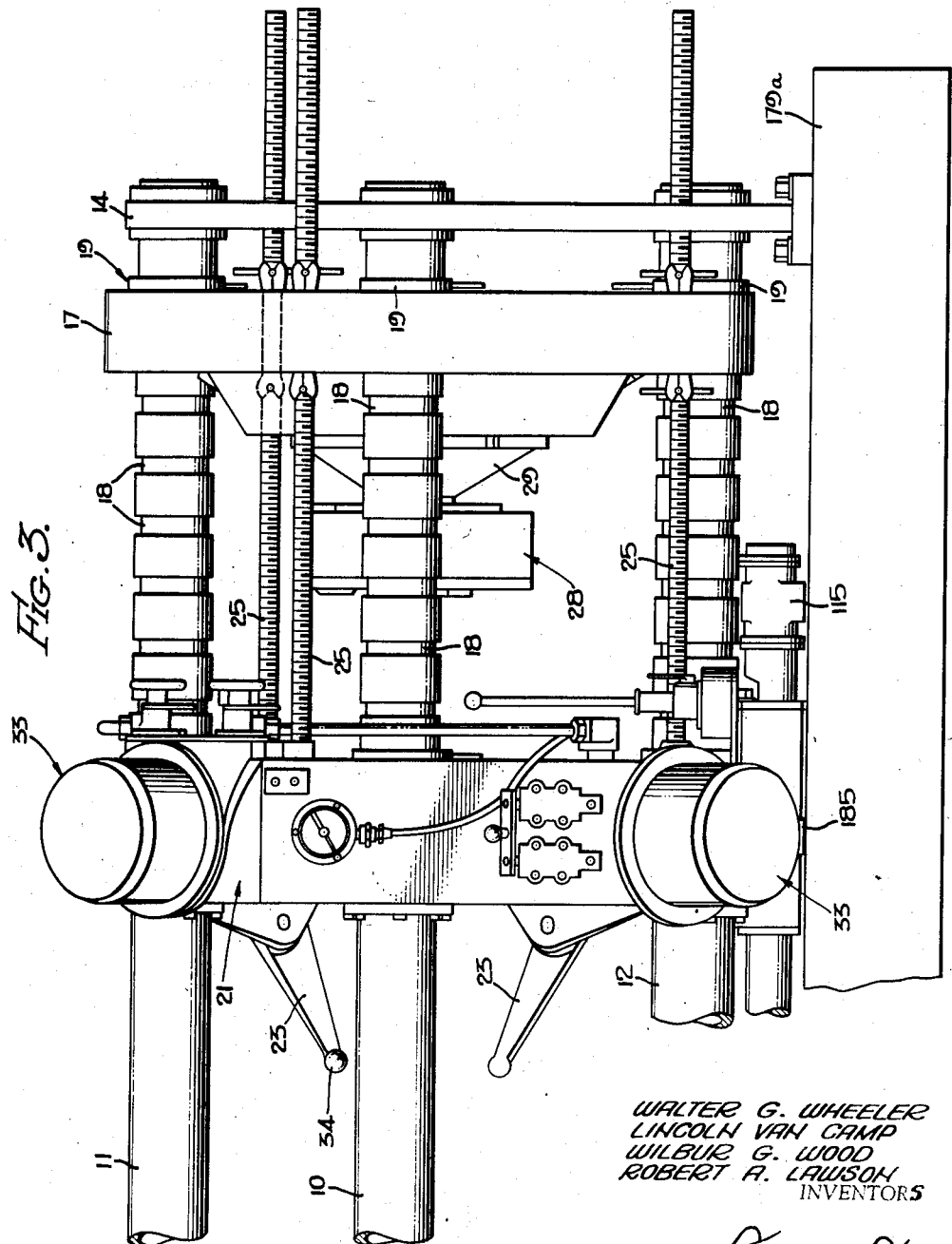

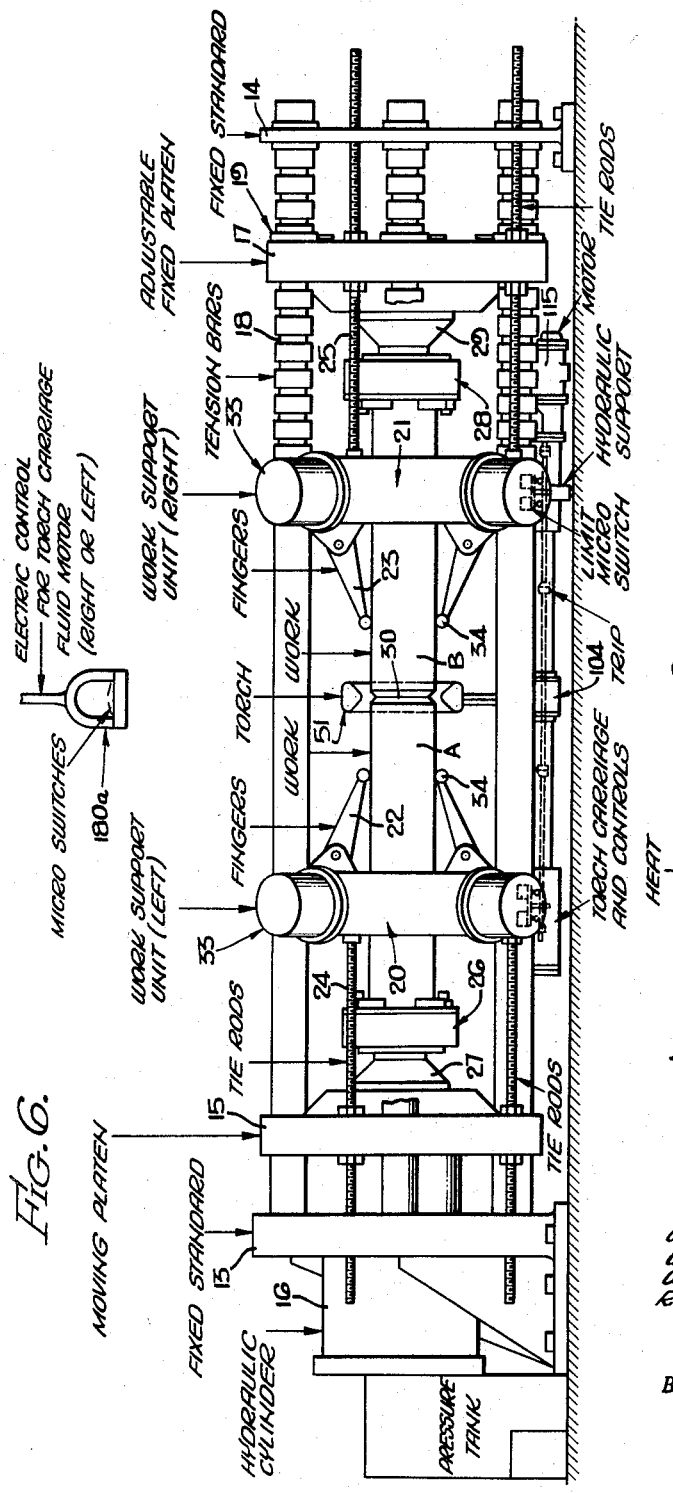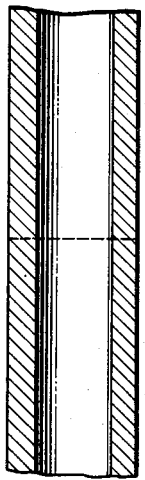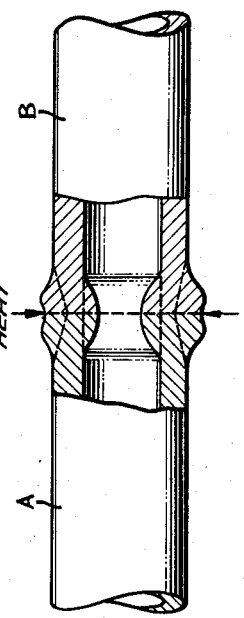

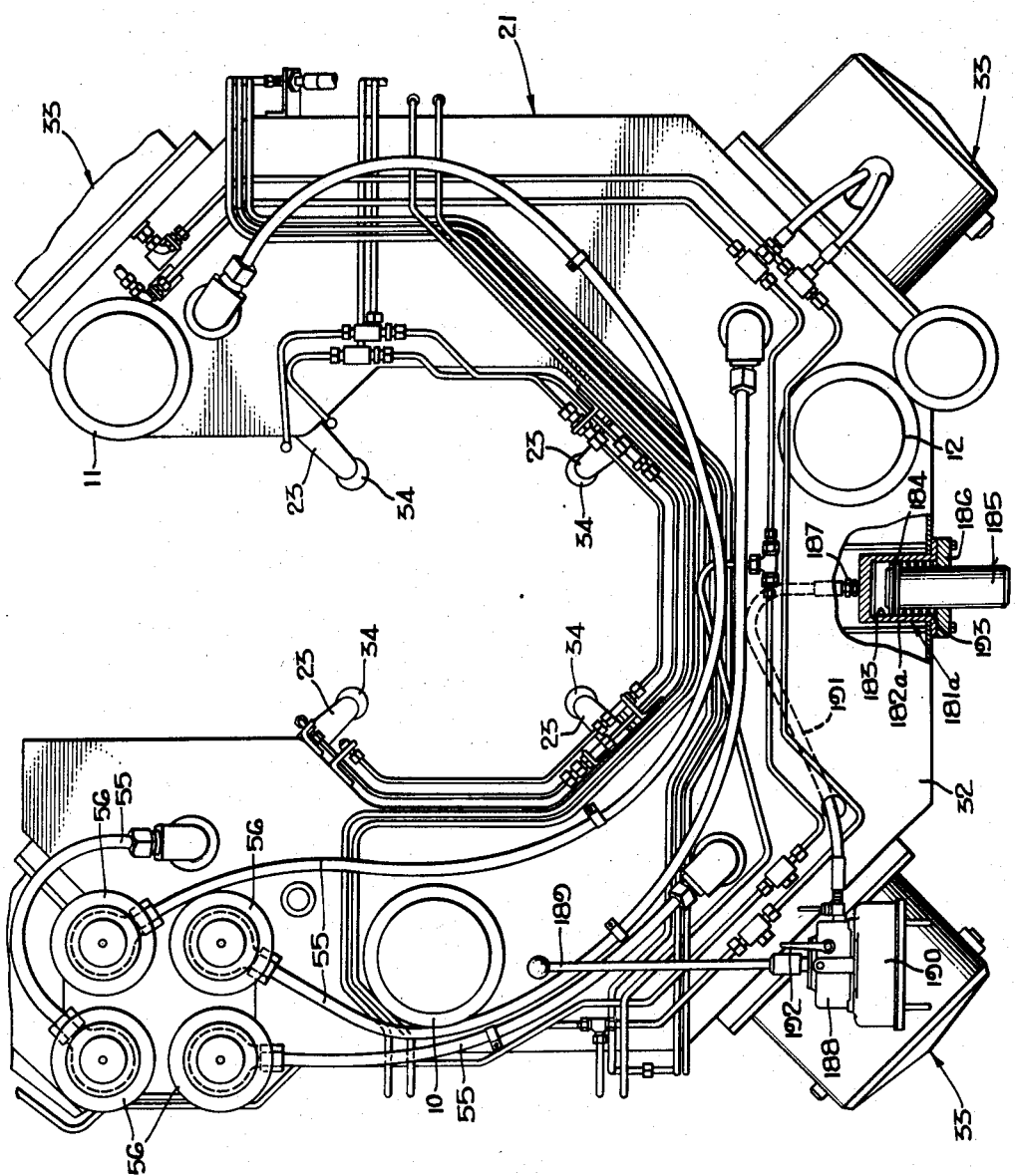

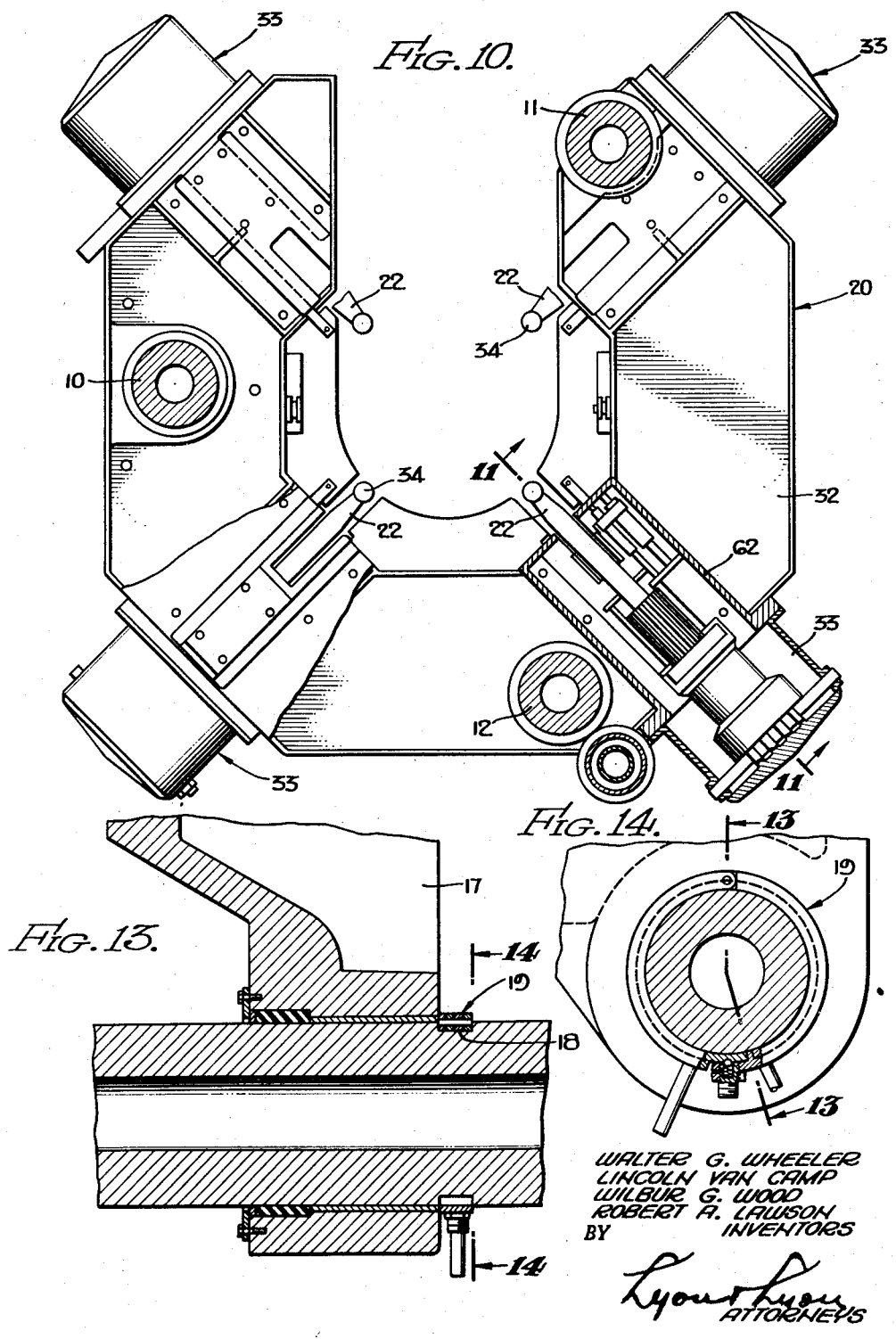

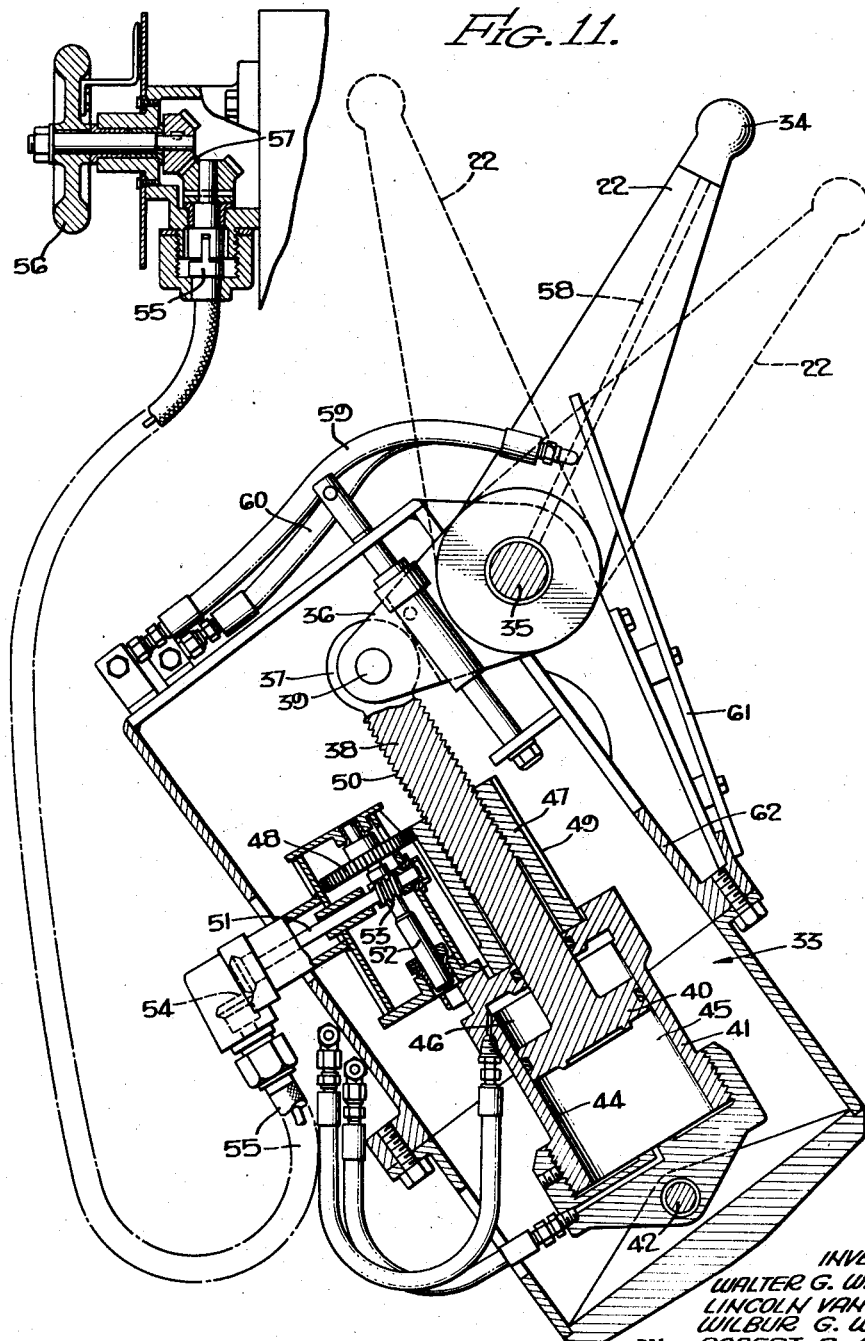

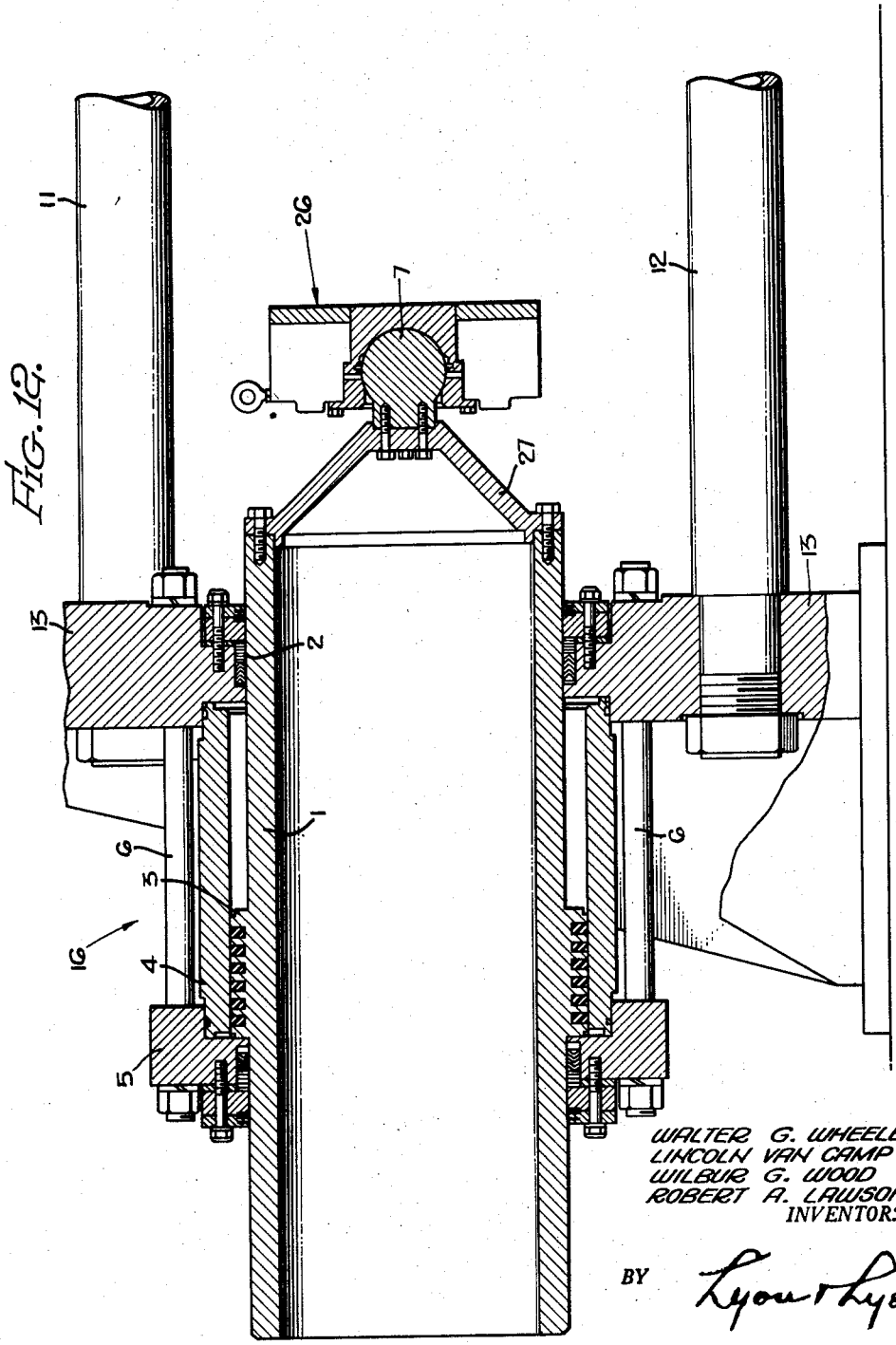

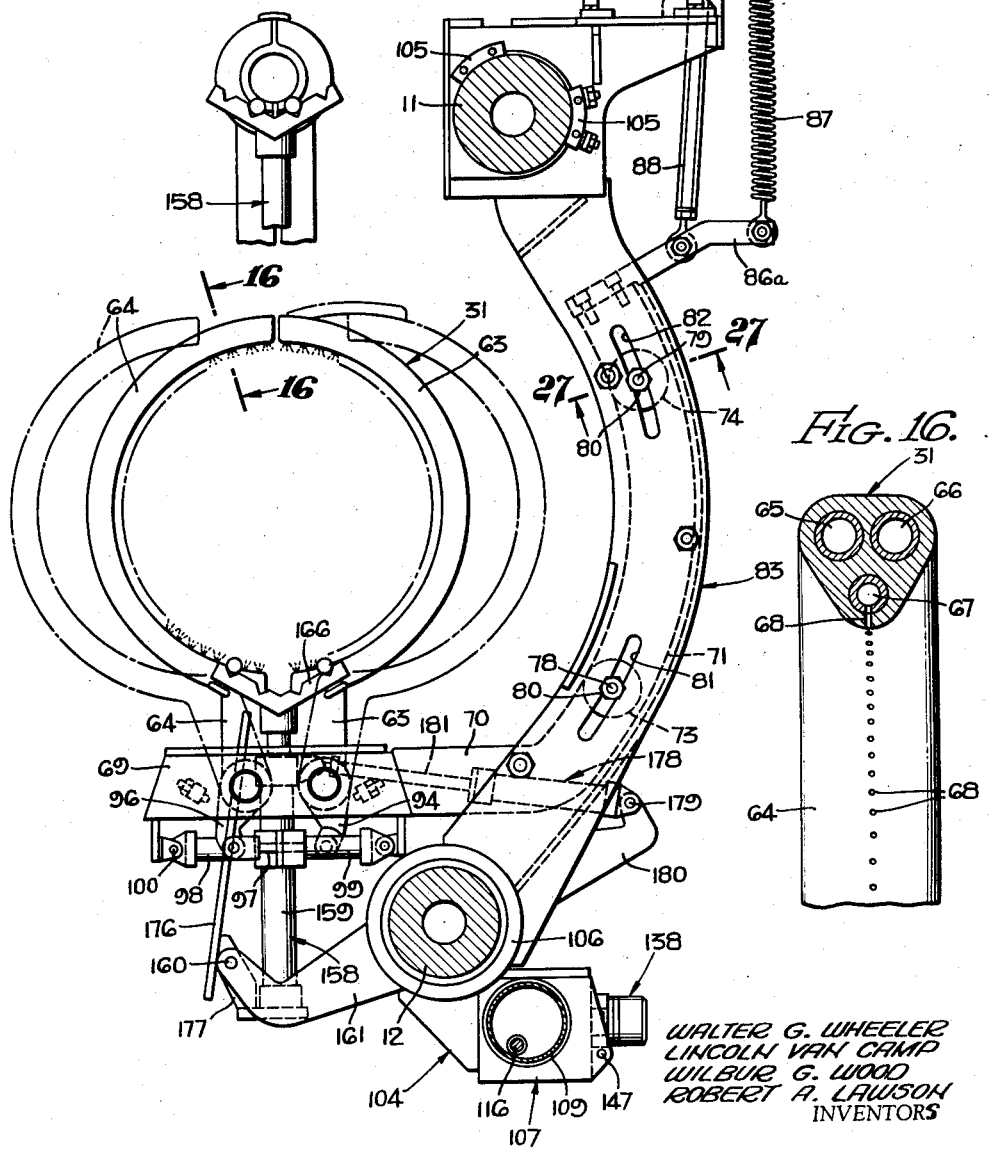

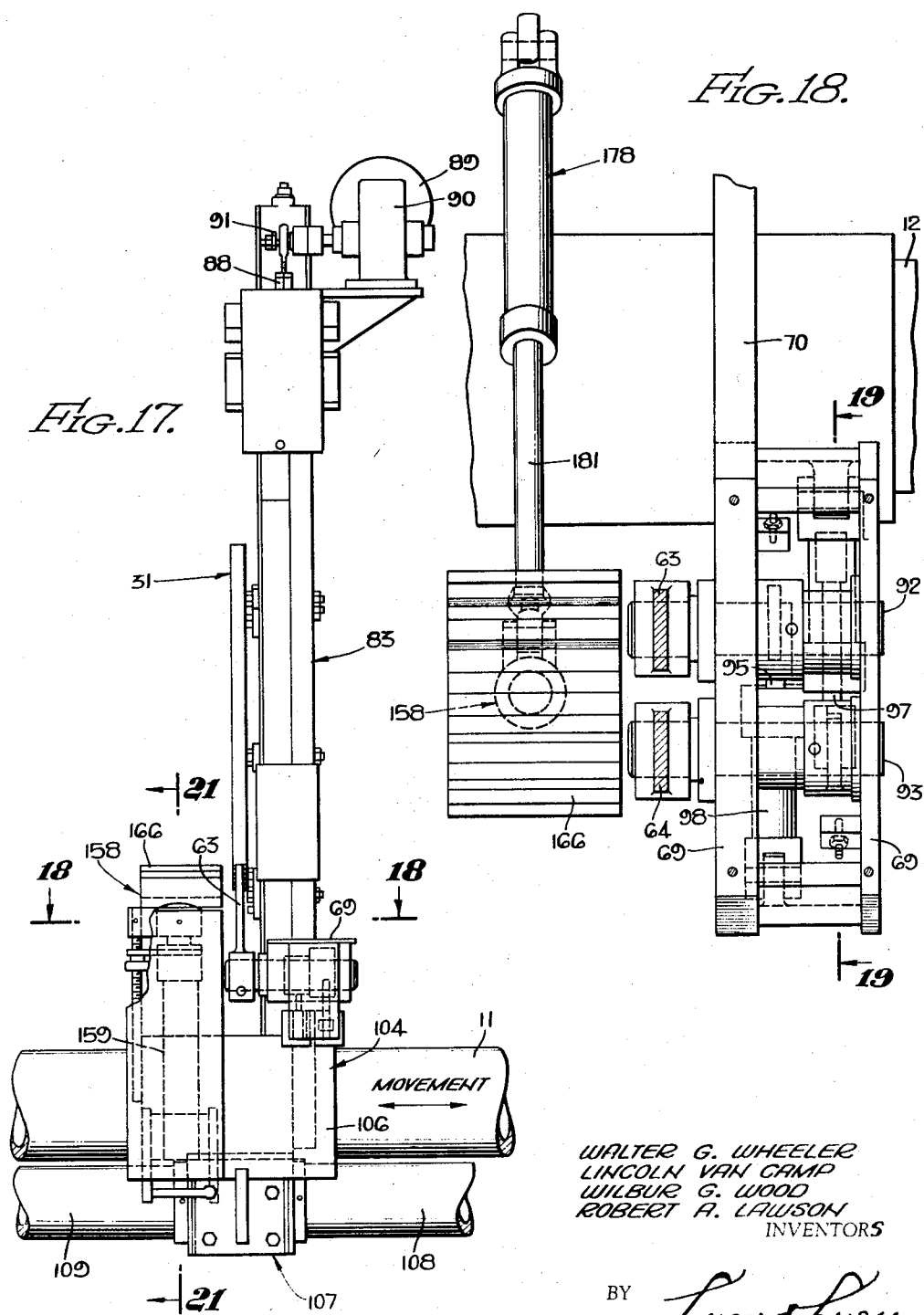

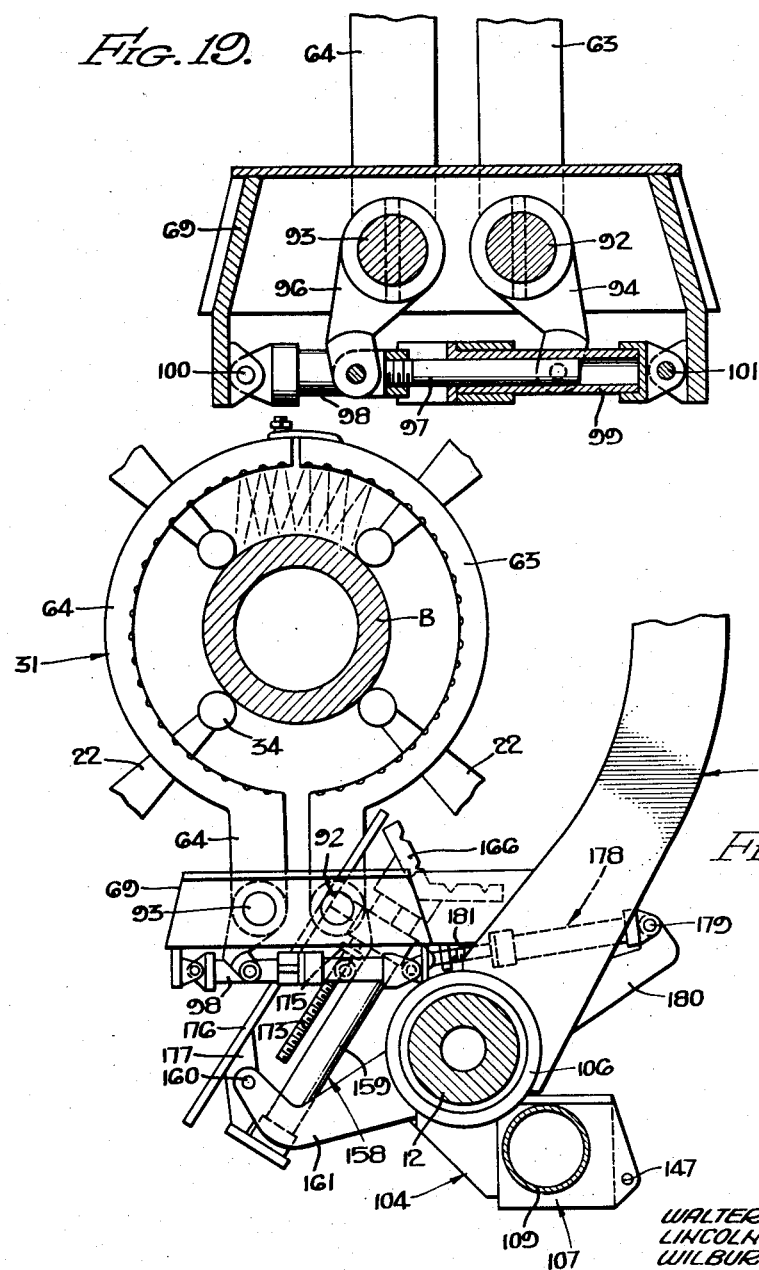

WALTER G. WHEELER
LINCOLN VAN CAMP
WILBUR G. WOOD
ROBERT A. LAWSON
INVENTORS

BY *Lyon+Lyon*

ATTORNEYS

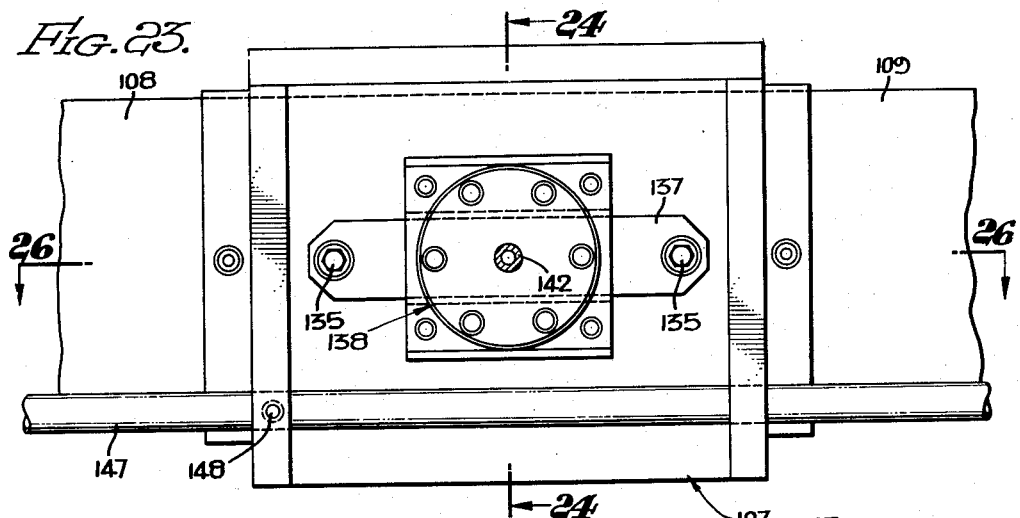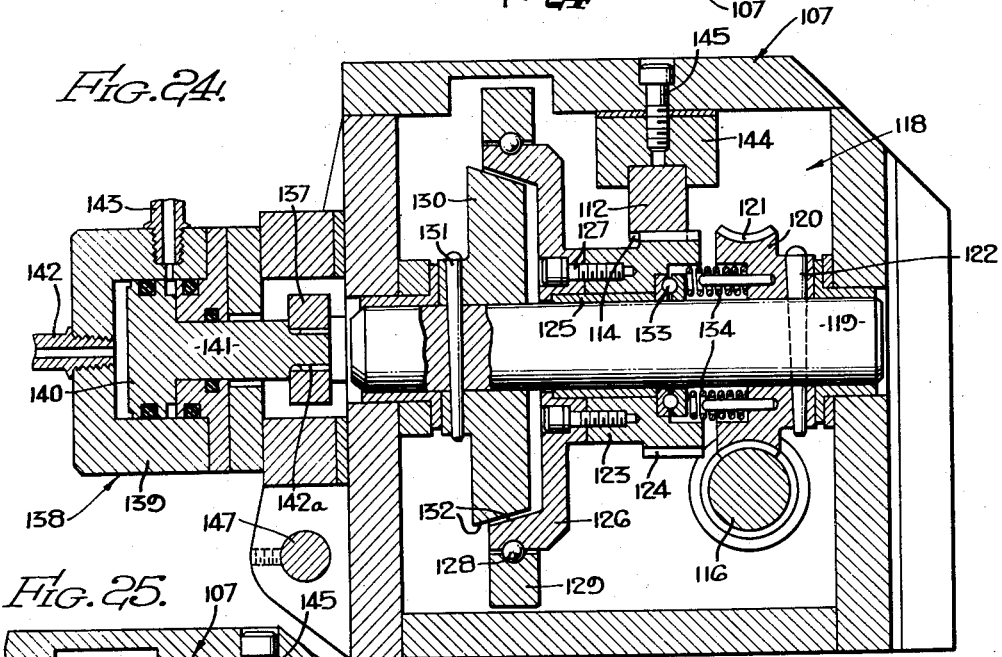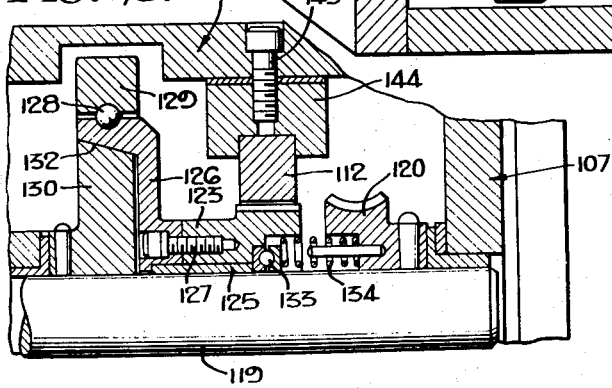

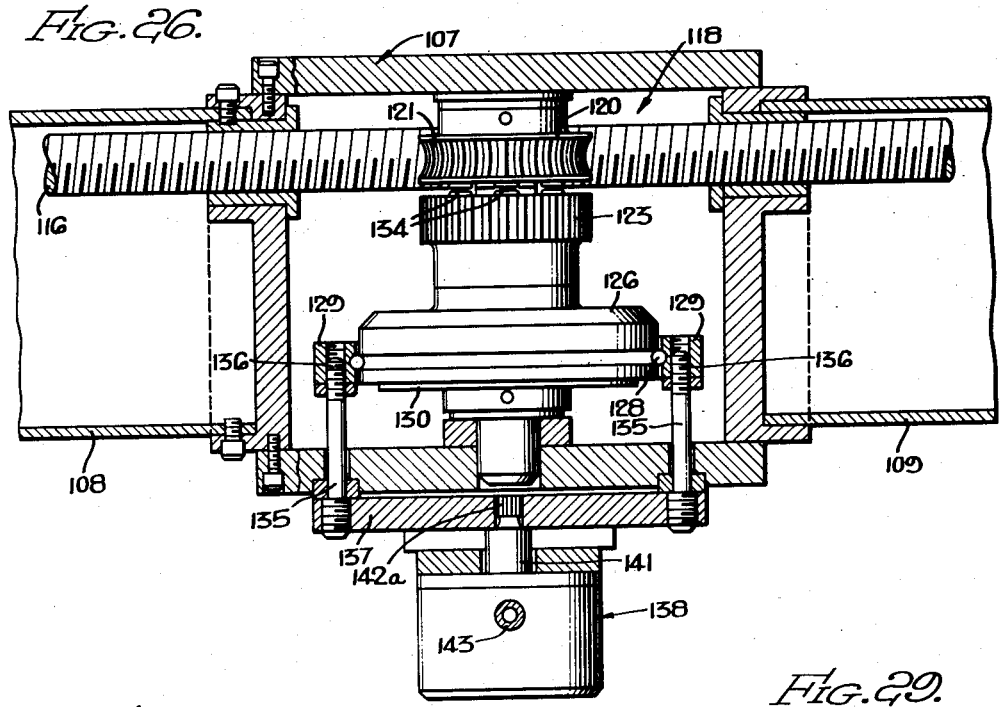
Fig. 26.
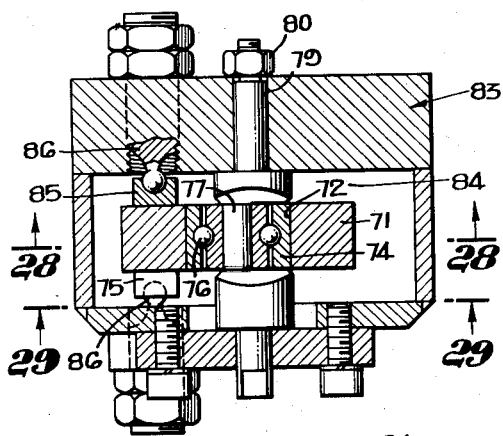
Fig. 27.
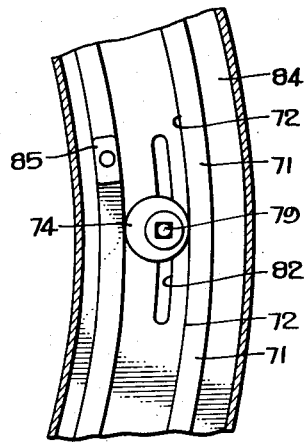
Fig. 29.
Fig. 28.
WALTER G. WHEELER
LINCOLN VAN CAMP
WILBUR G. WOOD
ROBERT A. LAWSON
INVENTORS
BY Lyon & Lyon
ATTORNEYS

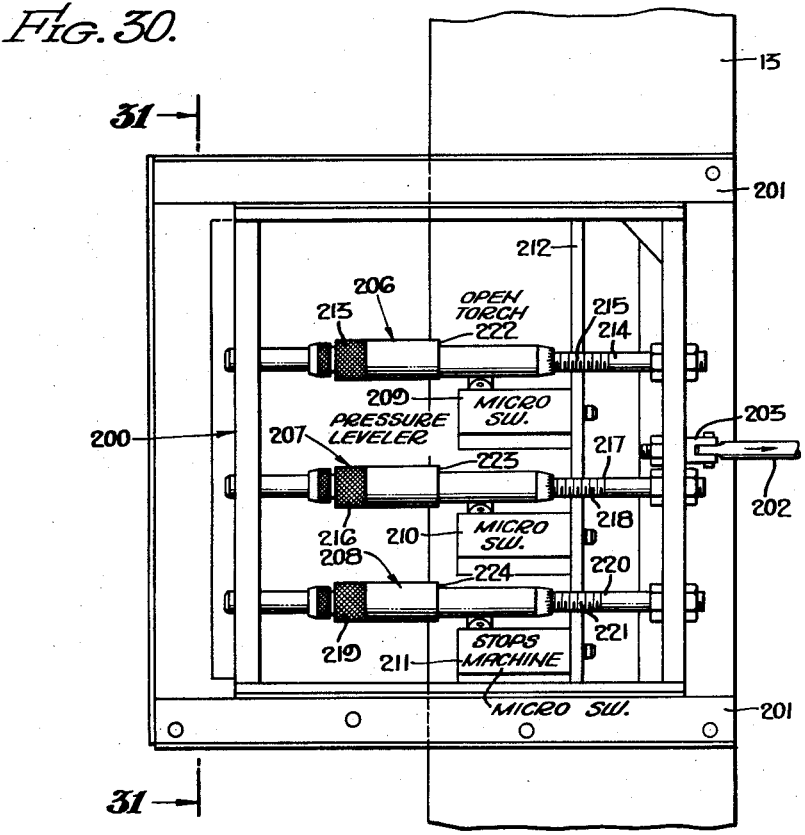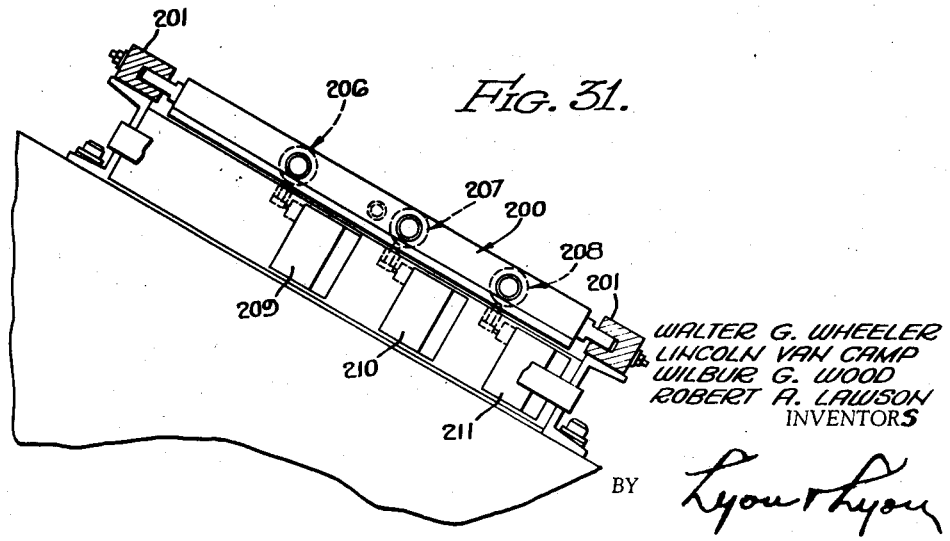

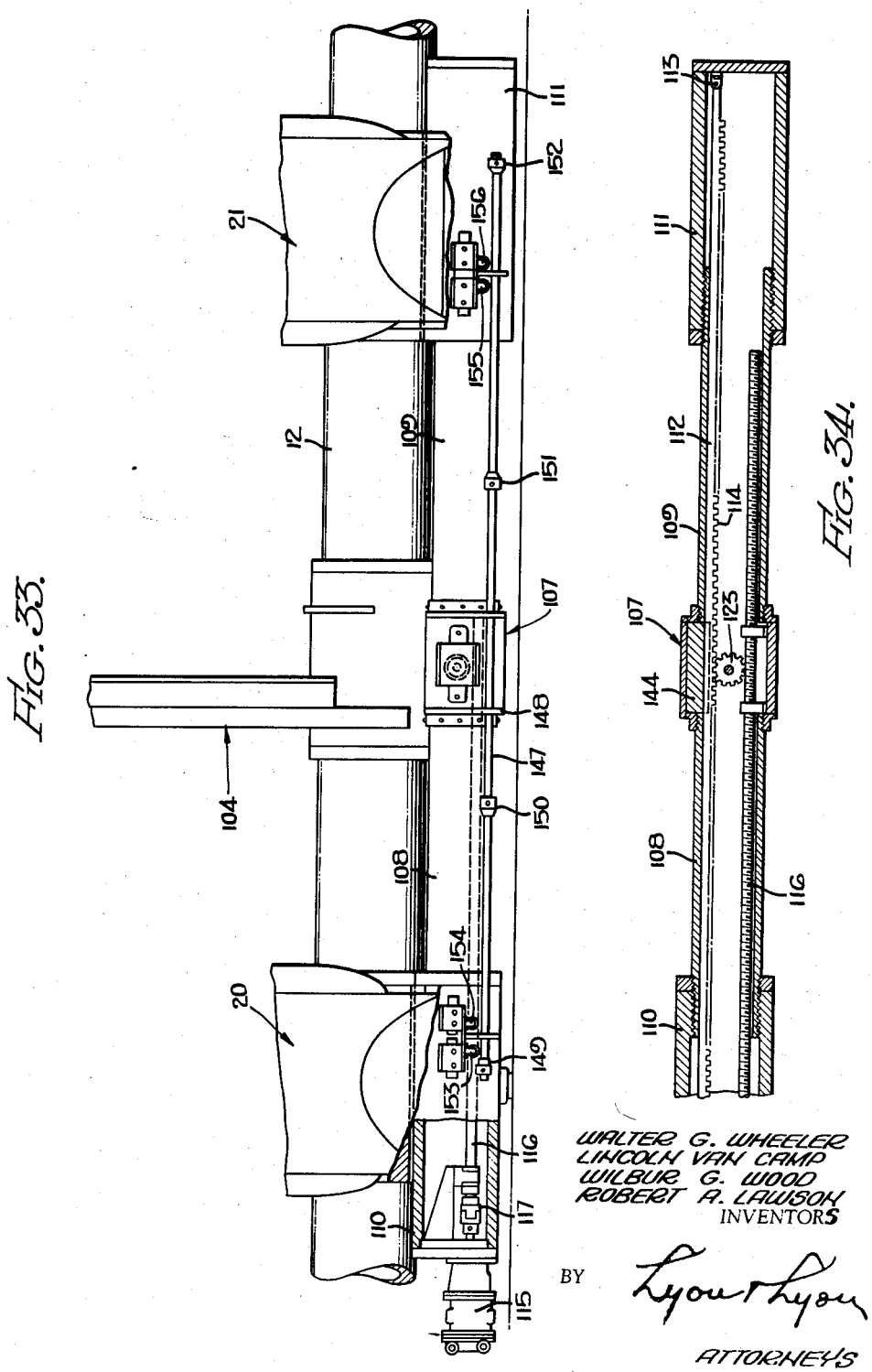

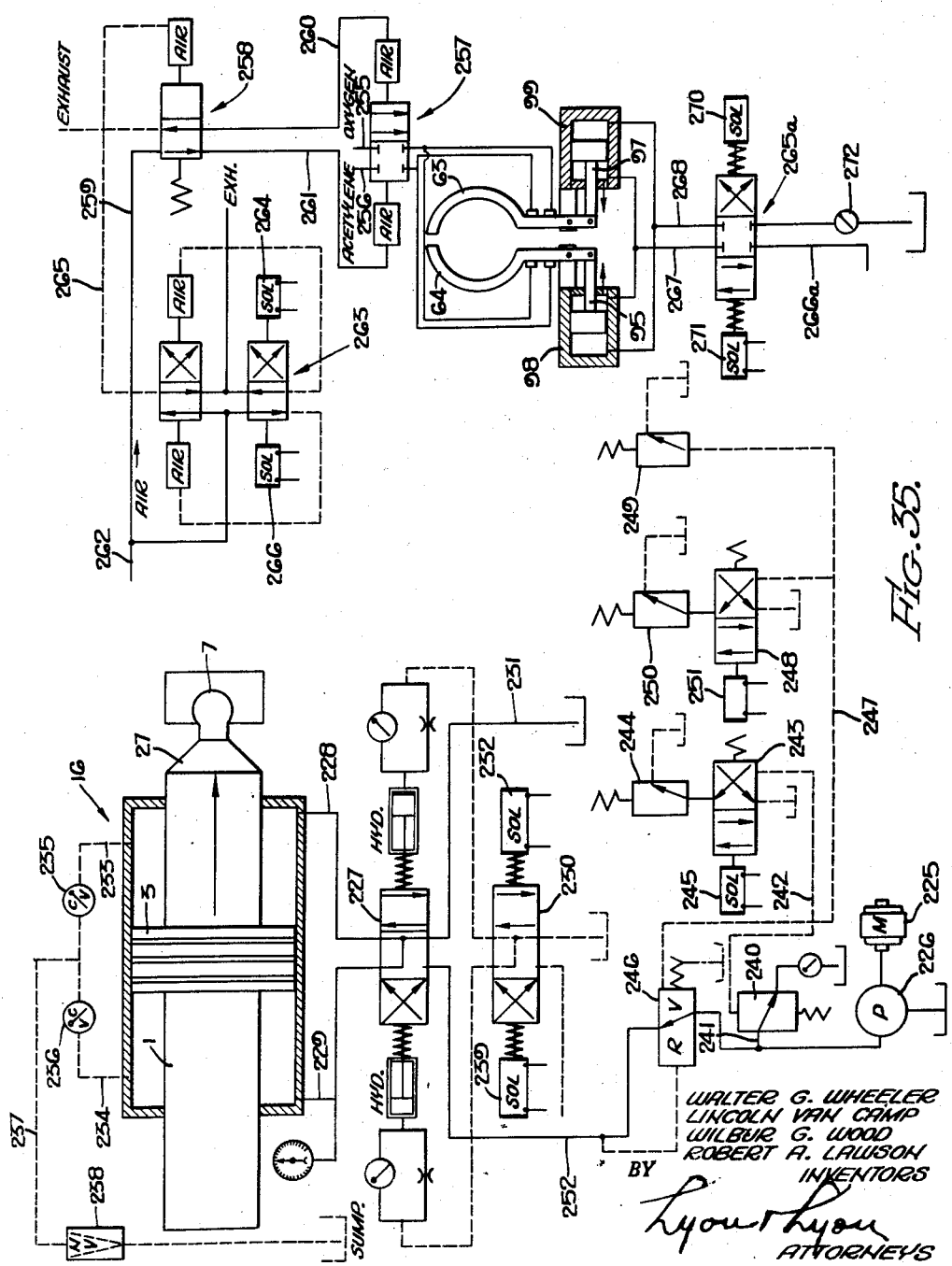

United States Patent Office 2,944,449
Patented July 12, 1960

2,944,449
PRESSURE WELDING APPARATUS

Walter G. Wheeler, Los Angeles, Calif., Lincoln Van Camp, Fort Worth, Tex., and Wilbur G. Wood, Glendale, and Robert A. Lawson, La Crescenta, Calif., assignors to Menasco Manufacturing Company, Burbank, Calif., a corporation of California Filed Apr. 9, 1957, Ser. No. 653,508

7 Claims. (Cl. 78—82)

This invention relates to pressure welding apparatus, and is particularly directed to improvements in apparatus for producing welded joints between end faces of tubular members of relatively large size.

Special purpose machines of the general type to which this invention pertains have been constructed for particular uses such as pipe line welding, railroad rail welding, and machines for welding tool joints to drill pipe of the type used in the drilling of wells by the rotary process. Special purpose machines of these various types each lack adaptability for general purpose work, and furthermore are unsuited to accommodate weld component parts of varying shapes and sizes, such as, for example, as are encountered in large-size landing gear mechanism for present-day aircraft. One of the objects of this invention is to provide pressure welding apparatus employing a horizontal three-column frame which permits easy vertical access for the parts to be welded and, at the same time, permits ready access from the side over one waist-high tie rod for the operator. Three tie rods permit an even distribution of welding pressure on the work pieces while eliminating the usual easy plane of bending typical of the two-column design.

Another object is to provide a welding device of this type characterized by easy set up of the parts of the apparatus for any particular weld geometry, and characterized by flexibility and adaptability to parts of different sizes and shapes.

Another object is to provide a large-capacity pressure welding machine of the type described, which produces welded parts having very close alignment and dimensional tolerances. This feature of the invention is achieved by several related improvements in construction and design. The essential parts of the apparatus which tend to change location during the welding cycle because of temperature change are all designed for internal water cooling. Also, distortion is minimized in the main frame of the apparatus by balancing forces about the weld center line to provide for least movement in location when the work pieces are in place and whether the pressure welding forces are either applied or inactive. Furthermore, the weight of the components of the welding apparatus is at least partially absorbed by an intermediate jacking device which provides minimum distortion and misalignment of the machine parts by dead weight. A further important advantage in maintaining increased accuracy resides in the positioning of the work-holding devices in a manner such that growth of the welded parts during the welding operation is permitted without changing the center line registration thereof.

Another object of the invention is to provide pressure welding apparatus in which endwise pressure on the weld face is maintained at a high value during the first part of the welding cycle and wherein this pressure is automatically reduced to a substantially lower value during a subsequent portion of the welding cycle.

Other, related, and more detailed objects and advantages will appear hereinafter.

In the drawings:

Figure 1 is a side elevation showing a preferred embodiment of our invention.

Figure 2 is a side elevation of a left-hand portion of the apparatus shown on an enlarged scale.

Figure 3 is a side elevation of a right-hand portion of the apparatus.

Figure 4 is an end elevation.

Figure 5 is a transverse sectional elevation taken substantially on the lines 5—5 as shown in Figure 1.

Figure 6 is a side elevation in diagrammatic form.

Figure 7 is a view partly in section showing a completed weld between a pair of tubular members.

Figure 7a is a sectional view showing the final form of the welded joint after interior and exterior upsets have been removed.

Figure 9 is a transverse sectional view taken substantially on the lines 9—9 as shown in Figure 1.

Figure 10 is a sectional elevation taken substantially on the lines 10—10 as shown in Figure 1.

Figure 11 is a sectional detail taken substantially on the lines 11—11 as shown in Figure 10.

Figure 12 is a sectional elevation partly broken away taken substantially on the lines 12—12 as shown in Figure 4.

Figure 13 is a sectional detail taken substantially on the lines 13—13 as shown in Figure 14.

Figure 14 is a sectional elevation taken substantially on the lines 14—14 as shown in Figure 13.

Figure 15 is an end elevation partly in section taken substantially on the lines 15—15 as shown in Figure 1, and showing the torch carriage assembly.

Figure 16 is a cross section of the torch head taken substantially on the lines 16—16 as shown in Figure 15.

Figure 17 is a front elevation of the apparatus shown in Figure 15.

Figure 18 is a plan view partly in section, taken substantially on the lines 18—18 as shown in Figure 17.

Figure 19 is a sectional elevation taken substantially on the lines 19—19 as shown in Figure 18.

Figure 20 is a sectional elevation similar to Figure 15, showing the parts in a different position.

Figure 23 is a front elevation of a clutch mechanism that operates a set of microswitches to move or stop the torch mechanism.

Figure 24 is a sectional view taken substantially on the lines 24—24 as shown in Figure 23.

Figure 25 is a sectional view showing a portion of Figure 24 on an enlarged scale and showing the clutch engaged.

Figure 26 is a sectional plan view taken substantially on the lines 26—26 as shown in Figure 24.

Figure 27 is a sectional detail taken substantially on the lines 27—27 as shown in Figure 15.

Figure 28 is a fragmentary sectional view taken substantially on the lines 28—28 as shown in Figure 27.

Figure 29 is a sectional view, partly broken away, taken substantially on the lines 29—29 as shown in Figure 27.

Figure 30 is an enlarged view of the metering mechanism as shown by the arrow 30 in Figure 1.

Figure 31 is a side elevation, partly broken away, taken substantially in the direction shown by lines 31—31 in Figure 30.

Figure 32 is an end elevation showing a portion of Figure 30.

Figure 33 is a schematic diagram, partly in section, showing the torch and limit stop mechanism.

Figure 34 is a longitudinal sectional view of a portion of the apparatus shown in Figure 33.

Figure 35 is a schematic diagram showing certain of the hydraulic and electric controls.

General layout

Figure 8:
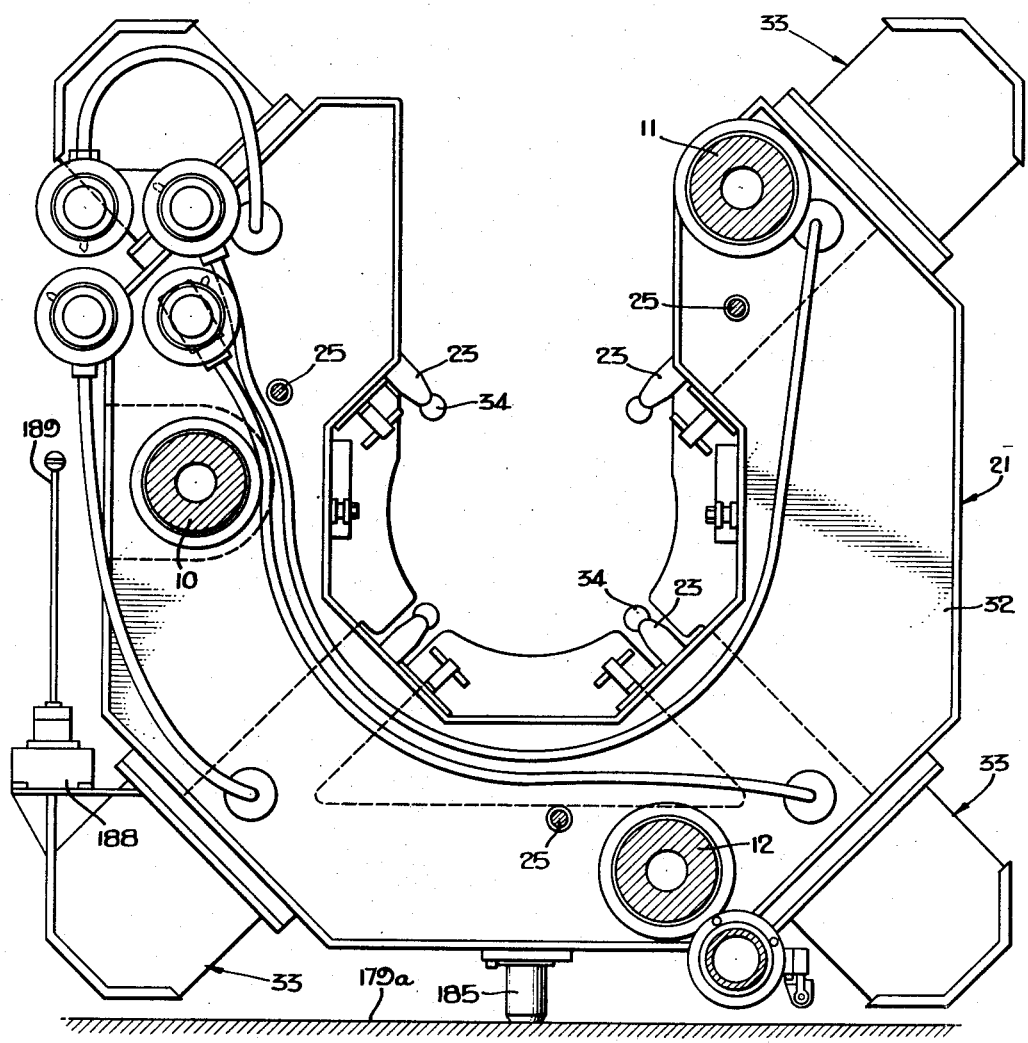
Figure 8 is a transverse sectional elevation taken substantially on the lines 8—8 as shown in Figure 1.

As best shown in Figures 1 to 6, the welding apparatus embodying this invention includes three parallel horizontal columns 10, 11 and 12 extending between fixed vertical standards 13 and 14. The columns or tension bars are arranged in a form of an isosceles triangle in which the column 10 is equally spaced from the columns 11 and 12. Preferably, the column 11 is not directly over the lower column 12, but is offset slightly to the rear thereof. The ends of the horizontal columns are each fixed to the standards 13 and 14. A moving platen 15 is slidably mounted on the parallel columns or tension bars 10, 11 and 12, and is connected to the main hydraulic cylinder assembly 16 which supplies the force to move it along the horizontal columns. A fixed platen 17 is mounted to slide on the horizontal columns near the fixed standard 14, and this platen 17 is adapted to be fixed to the horizontal columns at one of a plurality of positions, in order to accommodate work pieces of various lengths. The columns 10, 11 and 12 are each provided with a plurality of equally spaced grooves 18, and suitable collars 19 are provided which cooperate with the grooves to secure the platen 17 at any desired position along the length of the horizontal columns in the vicinity of the fixed standard 14.

A pair of work support units 20 and 21 are mounted to slide on the horizontal columns or tension bars 10, 11 and 12 in locations between the positions of the platens 15 and 17. These work support units 20 and 21 are substantially duplicates except that one is right-handed and the other left-handed. Each of these work support units is U-shaped, as best shown in Figures 8, 9 and 10, and each has a vertical entrance slot through which work pieces to be welded may be lowered into axially aligned positions. Each of these work support units pivotally supports four independently movable fingers 22, 23. The fingers are each pivotally mounted on the work support units and extend longitudinally in a direction toward the plane of the weld. Power mechanism is provided on each of the work units for swinging the fingers 22 and 23 toward and away from the work pieces to be welded. Tie rods 24 connect the work support units 20 with the moving platen 15 so that they move longitudinally as a unit. Similarly, tie rods 25 connect the work support unit 21 to the adjustable platen 17. The tie rods 24 and 25 are threaded so that spacing between the work support units and their respective platens may be adjusted as desired.

A work-gripping assembly 26 is carried on the moving element 27 of the hydraulic cylinder assembly 16, and a similar work-gripping assembly 28 is mounted on a thrust receiving element 29 carried on the fixed platen 17.

In the general plan of operation, the work pieces A and B are supported in end-to-end alignment in the gripping devices 26 and 28 and in the adjustable fingers 22 and 23. Pressure is developed between the contacting end surfaces 30 by means of the hydraulic cylinder assembly 16. A circular welding torch assembly 31 encircles the end surfaces 30 of the work pieces A and B and heats them while endwise pressure is being applied. Heating of the metal adjacent the weld plane permits it to upset under the endwise load applied by the hydraulic cylinder assembly 16, and movement of the part A occurs with respect to the part B. The moving element 27, platen 15, tie rods 14, work support 20 and fingers 22 move as a unit with the work piece A. The heating torch assembly 31 moves through one-half the distance in order to maintain the torch in position to encircle the weld plane. The fingers 23, work support 21, tie rods 25, and platen 17 remain stationary during the welding cycle.

Figure 7 shows a typical shape of the weld joint immediately after completion of the weld cycle. After removal of the internal and external upsets, the joint has the appearance illustrated in Figure 7a. For simplicity and ease of illustration, the parts A and B to be welded are shown as straight lengths of tubular material, but it will be understood that this is by way of illustration only and the parts to be welded may comprise various different shapes, such as, for example, as are found in aircraft landing gear components. The weld plane, however, is always transverse to the horizontal columns or tie bars 10, 11 and 12, and is always situated centrally between them. Ordinarily the shape of the welded parts adjacent the weld plane is tubular.

As shown in Figure 12, the main cylinder assembly 16 includes a large hollow piston rod 1 which slides within a central opening 2 in the fixed standard 13. The hollow piston rod 1 carries piston 3 which slides within the bore of the cylinder 4. The end flange 5 of the cylinder 4 is held in position by means of the rods 6 which extend through the standard 13. A ball joint self-aligning connection 7 is provided between the piston rod 1 and the connection device 26.

Work support units

The work support units 20 and 21 are each slidably mounted on the horizontal tension bars or columns, and each is a U-shaped frame 32 having a central opening and a vertical entrance slot. Symmetrically positioned on each frame 32 is a plurality of power units generally designated 33. Each power unit individually actuates one of the work support fingers 22, 23. As best shown in Figure 11, each finger 22 is in the form of a bell crank having an integral spherical portion 34 formed on its extending end. A pivot shaft 35 supports the finger for swinging movement to positions shown by the phantom lines in Figure 11. The pivot shaft 35 is carried on the frame 32. A crank arm 36 formed integrally with the finger 22 takes the form of a clevis which receives the terminal fitting 37 on the extending end of the piston rod 38. A pivot pin 39 connects the clevis to the terminal end 37. A piston 40 fixed to the rod 38 travels within a cylinder 41 pivotally mounted at 42. Hydraulic connections are provided for the space 45 within the bore 44 and for the space 46 within the cylinder 41. When hydraulic fluid is introduced into the space 46 and vented from the space 45, the piston 40 is retracted within the cylinder in a direction to swing the finger 22 in a counter-clockwise direction. Similarly, when hydraulic fluid is introduced into the space 45 and vented from the space 46, the piston 40 moves in a direction to extend the piston rod 38 and cause the finger 22 to swing in a clockwise direction.

Means are provided for mechanically adjusting the range of swinging movement of the finger 22. This is accomplished by adjusting the position of the stop nut 47 along the length of the piston rod 38. As shown in the drawings, this is accomplished by means of a driving gear 48 meshing with the elongated teeth 49 of the outer surface of the stop nut 47. Rotation of the gear 48 serves to cause the nut 47 to turn on the threads 50 provided on the outer surface of the piston rod 38. The driving gear 48 may be turned in any convenient or desirable fashion and, as shown in the drawings, the mechanism provided includes a worm shaft 51 driving the gear shaft 52 via worm gearing 53. Mitre gears 54 serve to connect the flexible driving shaft 55 with the worm shaft 51. Hand wheel 56 in an accessible location on the frame 32 turns the flexible driving shaft 55 through mitre gears 57. From this description it will be understood that turning of the hand wheel 56 serves to adjust the position of the stop nut 47 along the length of the piston rod 38 and thereby regulate the range of angular travel of the finger 22. The motion of the finger is achieved by hydraulic power supplied to the spaces 45 and 46 as described above.

The fingers are prevented from overheating by means of water cooling passages 58 which extend longitudinally of the fingers. Suitable flexible connections 59 and 60 are provided for circulating cooling water into and out of each finger. A shield 61 may be provided adjacent each finger to minimize transfer of heat by conduction and radiation into the interior of the case or shell 62 which houses each of the finger actuating assemblies 33.

Figure 9 shows a typical layout of hydraulic piping connections and flexible shaft arrangements for supplying hydraulic power to the units 33, circulating cooling water to the fingers, and for operating the gear mechanisms within each of the cases 62.

Torch mechanism

The torch assembly generally designated 31 includes a pair of cooperating semi-circular halves 63 and 64. Each of these parts 63 and 64 is provided with a pair of water cooling passages 65 and 66, and a separate passage 67 in which a combustible gas mixture passes to emerge through radial ports 68. Oxygen and acetylene gases are mixed and supplied to the passage 67. The mixture of gases is ignited at each of the ports 68 so that a substantially continuous ring of flame is projected radially inward from the half sections 63 and 64.

A support or platform 69 is carried on an extending end 70 of an arcuate beam 71. The beam 71 has an arcuate slot 72 struck from the center line of the work pieces A and B. Rollers 73 and 74 are mounted within the slot 72 to guide the movement of the beam 71. Each of these rollers is mounted on a roller bearing assembly 76, carried on an offset portion 77 of a support shaft 78, 79. Locknuts 80 are provided for the shaft 78 and 79 for securing the shafts in angularly adjusted position. The shafts 78 and 79 are received in slots 81 and 82 respectively provided in the curved arch member 83. This arch member has end portions which are slidably mounted on the horizontal columns 11 and 12 respectively. The rollers 73 and 74 and the curved beam 71 are mounted within a cavity 84 provided within the arch beam member 83. Lateral canting or twisting of the curved beam 71 within the cavity 84 is prevented by means of the slipper pads 85 carried on adjustable, self-aligning supports 86.

A bracket 86 is fixed to the upper end of the curved beam 71 and is supported by means of a spring 87 and a driving pitman 88. An electric driving motor 89 acting through a speed reduction unit 90, drives a crank arm 91 connected to the upper end of the pitman 88. When the motor 89 turns, the pitman 88 raises and lowers the bracket 86, thereby causing the curved beam 71 to oscillate in an arc concentric with the axes of the work pieces A and B. The support platform 69 carried on the curved beam 71 is thus caused to oscillate the torch halves 63 and 64 about the center line of the work pieces.

Means are provided for swinging the torch halves 63 and 64 to the open position as indicated by the phantom lines in Figure 15. As shown in the drawings, this means includes pivotal supports 92 and 93 on the platform 69 for the parts 63 and 64, respectively. The part 63 has an integral crank arm 94 formed thereon and pivotally connected to a piston rod 95. Similarly, the part 64 has a crank arm 96 integrally fixed thereon and pivotally connected to a piston rod 97. The rod 95 is slidably mounted within the cylinder 98 and the rod 97 is slidably mounted within the cylinder 99. When the crank arms 94 and 96 are swung toward each other, the torch parts 63 and 64 are swung apart to their open (inoperative) position. Movement of the crank arms 94 and 96 in this manner is accomplished by means of hydraulic connections (not shown) to the cylinders 98 and 99 so that the piston rods operate in unison. The cylinders are pivotally mounted on the platform 69 at 100 and 101, respectively.

The torch carriage, generally designated 104, includes the arch member 83, the slipper pads 105 which ride on the horizontal column 11, and the bearing sleeve 106 which slides on the horizontal column 12. The clutch housing 107 is fixed to the bearing sleeve 106 and forms a part of the carriage 104. Tubular shells 108 and 109 project in opposite directions from the clutch housing 107 and are fixed relative thereto. The tubular shell 108 telescopes into and is slidably received within a socket member 110 carried on the adjustable work support 21. Similarly the tubular shell 109 telescopes into and is slidably received within the socket member 111 mounted on the work support 20. A gear rack 112 is fixed at 113 to the socket member 111 and extends through the tubular shell 109, gear housing 107, and into the tubular shell 108. Gear teeth 114 are formed on the underside of the rack 112. The hydraulic motor 115 is mounted on the socket member 110 and is arranged to rotate a worm shaft 116 through a coupling connection 117. A worm shaft 116 extends axially through the tubular shell 108, clutch housing 107, and into the tubular shell 109.

A clutch assembly, generally designated 118, is mounted within the clutch housing 107 and is best shown in Figures 23–26. This clutch assembly includes a transverse shaft 119 extending between the rack 112 and the worm shaft 116. A worm wheel 120 having teeth 121 is fixed on the shaft 119 by means of a taper pin 122. A spur gear 123 has straight teeth 124 which mesh with the teeth 114 on the underside of the rack 112. A bushing 125 supports the gear 123 for both rotary and axial movement relative to the shaft 119. The gear 123 is fixed to a clutch ring 126 by means of threaded fasteners 127. The gear 123 and the clutch ring 126 function as a single integral unit. A circumferential series of balls 128 serve as an anti-friction bearing connecting the clutch ring 126 to the actuator ring 129. The clutch cone 130 is fixed to the shaft 119 by means of the taper pin 131. When the actuator ring 129 is shifted to the left as viewed in Figures 24 and 25 to bring the friction surfaces 132 into engagement, the spur gear 123 and the worm wheel 120 are connected in driving relationship. When the surfaces 132 are disengaged, the driving engagement between the spur gear 123 and the worm wheel 120 is disconnected. A thrust bearing 133 is mounted on the spur gear 123 and is engaged by a series of coil springs 134 mounted on the worm wheel 120.

Means are provided for moving the actuator ring 129 axially of the shaft 119 and, as shown on the drawings, this means includes parallel rods 135 having threaded ends 136 secured to the actuator ring 129. The rods 135 project through a wall of the clutch housing 104 and their projecting ends are connected to a crossbar 137 positioned outside the housing 104. An air cylinder assembly 138 includes a cylinder 139 having a piston 140 mounted to travel therein carrying a piston rod 141. The piston rod 141 is fixed to the crossbar 137 at 142. When air under pressure is admitted through fitting 142 into the interior of the cylinder 139, the piston 140 and rod 141 are moved to the right as viewed in Figure 24 thereby causing the rods 135 and actuator ring 129 to separate the friction surfaces 132. This action also serves to compress the springs 134. When air under pressure is admitted through fitting 143 into the interior of the cylinder 139, the piston 140 and piston rod 141 are retracted toward the left to cause engagement of the friction surfaces 132. It will be observed that in the event of failure of air pressure, the coil springs 134 act in a direction to bring the friction surfaces 132 into engagement.

Since the gear rack 112 is fixed to the moving work support unit 20 at 113, it moves relative to the clutch housing 104 whenever the work support unit 20 is moved by the main hydraulic cylinder 16. In this axial movement, the gear rack 112 slides with respect to the guide block 144 which is fixed to the clutch housing 104 by means of threaded fastenings 145. If the clutch surfaces 132 are engaged, the spur gear 123 and worm wheel 120 are connected to turn as a unit, and the result is that the worm wheel is caused to roll along in the elongated worm shaft 116 after the manner of a spur gear meshing with a rack. Since the worm shaft 116 does not move axially, the shaft 119 and clutch housing 104 are caused to move in the same direction as the gear rack 112, but at one-half the rate of speed. For example, if the gear rack 112 were caused to move axially for a distance of one inch, the clutch housing 104 would move in the same direction for a distance of one-half inch.

If the clutch surfaces 132 are separated, by applying air under pressure to the fitting 142 axial motion of the gear rack 112 simply causes the spur gear 123 to turn relative to the shaft 119 without causing any translation of the clutch housing 104. The principal purpose of the tubular shells 108 and 109 is to provide an enclosure to exclude foreign matter from the gear rack 112 and the worm shaft 116.

When it is desired to adjust the position of torch 31 and torch carriage 104 along the horizontal columns 11 and 12, the hydraulic motor 115 is actuated to turn in either direction and thereby rotate the worm shaft 116 with respect to the worm wheel 120.

Means are provided for limiting the travel of the torch carriage 104 in either direction. As shown in the drawings, this means includes a rod 147 which is releasably secured to the clutch housing 107 by means of the locking screw 148. The rod 147 extends in both directions from the clutch housing parallel with the horizontal column or tie bar 12. Stop elements 149, 150, 151 and 152 are adjustably mounted on the rod 147 and are arranged to cooperate with electrical limit switches 153, 154, 155 and 156. These limit switches are connected to electrically operated valves (not shown) which control the operation of the hydraulic motor 115. Accordingly, over-travel of the torch carriage 104 toward or away from either of the work support units 20 or 21 is prevented by contact of one of the stop elements with one of the electrically limit switches.

*Work alignment guide*

Figure 21:
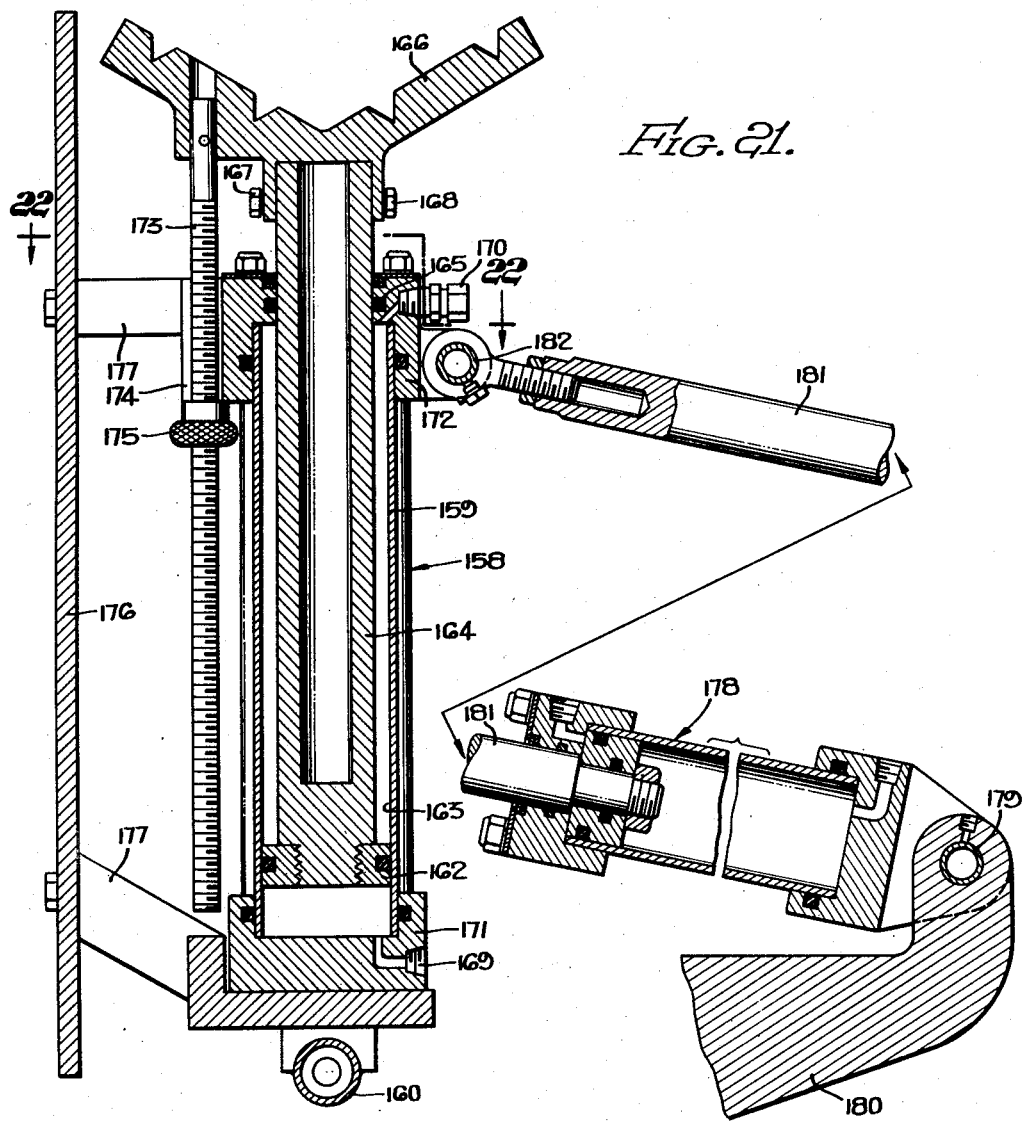
Figure 21 is a sectional elevation taken substantially on the lines 21—21 as shown in Figure 17.
Figure 22:
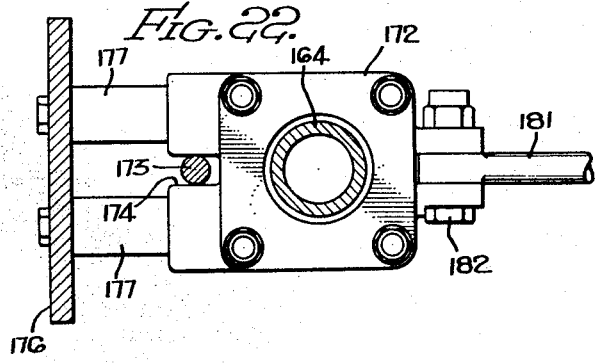
Figure 22 is a sectional plan view taken substantially on the lines 22—22 as shown in Figure 21.

Means are provided for supporting and aligning the ends of the work pieces A and B while the fingers 22 or 23 are being adjusted to the proper position. As best shown in Figures 15 to 22, inclusive, this alignment guide, generally designated 158, includes a power cylinder assembly 159, pivotally mounted at 160 on a bracket 161 fixed to the torch carriage 104. As best shown in Figure 21, the power cylinder assembly 159 includes a piston 162 slidably mounted within the bore 163 of the cylinder and having a hollow piston rod 164 projecting through packing 165 at the upper end of the cylinder. A work contacting member 166 in the shape of a flat V is fixed on the upper end of the piston rod 164 by means of the fastenings 167 and 168. Hydraulic connections 169 and 170 are provided in the cylinder end caps 171 and 172, respectively and communicate with the cylinder bore 163 on opposite sides of the piston 162. Accordingly, the piston 162 may be raised or lowered under power.

A threaded rod 173 is fixed at its upper end to the saddle 166 and extends downward through a slot 174 formed in the upper end cap 172. A nut 175 on the rod 173 serves to limit the extent of upward movement of the saddle 166. The shield 146 may be fixed to the end caps 171 and 172 by spacer elements 177, and the purpose of this shield 176 is to prevent molten metal from contacting the work alignment guide 158 during the welding operation. The work alignment guide 158 may be swung to an inoperative position as shown in Figure 20 by means of a power cylinder assembly 178 connected at 179 to the bracket 180 mounted on the torch carriage 104. The piston rod 181 is pivotally connected to the upper end cap 172 by means of the pivot pin 182. In this retracted position, the shield 176 intercepts any molten metal falling from the weld area and prevents it from contacting the work alignment guide 158.

In use, the work alignment guide 158 is moved along the parallel horizontal columns until it is positioned adjacent the location of the welds to be made between the ends of the members A and B. This movement of the work alignment guide 158 lengthwise of the horizontal columns is accomplished by moving the torch carriage 104 by means of the hydraulic motor 115, in the manner described above. The convenient hand-operated control switch mechanism 180 (see Figure 6) operates through an electrical circuit to control the supply of hydraulic fluid in driving the motor 115 in either direction. The saddle 166 is then raised hydraulically to the desired height. One of the work pieces is then lowered into position and one end thereof is rested on the saddle 166. The nut 175 on the rod 173 may be adjusted to limit the upward travel of the saddle 166. Assuming that work piece A is the one resting on the saddle 166, the grip mechanism 26 is adjusted to grip the other end of the work piece A and the fingers 22 of the work support unit 20 are then moved into contact with the outer surface of the member A. The saddle 166 is then lowered hydraulically and the work alignment guide 158 is moved to bring it into position under the end of the other work piece B. The saddle 166 is raised to the desired elevation and the work piece B is rested on this saddle and gripped by means of the mechanism 28. The fingers 23 on the work support unit 21 are then actuated to bring them into contact with the outer surface of the work surface B. The saddle 166 is then retracted, and the work alignment guide 158 is moved laterally to the inoperative position shown in Figure 20 by means of the power cylinder assembly 178. The torch carriage 104 is then moved to position the torch halves 63 and 64 at the location of the weld plane between the work pieces A and B. This is accomplished by operating the hydraulic motor 115 under control of the switch mechanism 180.

*Support jack*

In order to minimize deflections of the horizontal columns or tie bars 10, 11 and 12 under gravity load, jack means are provided on the stationary work support unit 21. As best shown in Figure 9 of the drawings, a power cylinder assembly 181 is mounted centrally on the lower portion of the frame of the support unit 21. A stationary cylinder 182 is provided with a vertical bore 183 which slidably receives a piston 184. A piston rod 185 projects through the end cap 186 and the lower end of this piston engages the floor 179 which supports the main frame of the entire machine. When hydraulic fluid is pumped under pressure into the cylinder 183 through the inlet fitting 187, the piston rod 185 is brought into contact with the floor, and further pressurizing of the bore 183 serves to raise the entire work support unit 21 and thereby counteracts deflection of the horizontal columns 10, 11 and 12 under gravity forces. The combined weight of the columns 10, 11 and 12, work support units 20 and 21 and associated mechanism, and the weight of the work pieces A and B is enough to cause objectionable deflection and misalignment of the welded parts. The power cylinder assembly 81 minimizes this objectionable feature.

A manually operable pump 188 is mounted on the frame of the work support unit 21 and provided with an upwardly extending actuating lever 189. Manual oscillation of this lever 189 in a conventional manner serves to pump hydraulic fluid from the reservoir 190 to the power cylinder assembly 181 by way of the hydraulic line 191 and inlet fitting 187. A release lever 192 is provided to release the pressure in the hydraulic line 191 when it is desired to retract the piston rod 185. When the pressure within the bore 183 is released, the spring 193 below the piston 184 raises the piston and piston rod 185 to the upper limit of travel. When the piston rod 185 is raised clear of the floor 179, the work support unit 21 may be moved along the tie bars 10, 11 and 12 by means of the adjusting screws 25 to any desired position.

*Controls*

It is desirable to provide controls which will cause the welding machine to operate automatically on the following cycle:

(a) Apply a very heavy endwise force to the work pieces A and B during the initial part of the welding cycle.

(b) Reduce this force to a much smaller value after the moving platen has traveled for a predetermined distance.

(c) Shut off the flame in the torch and swing the torch halves to open position prior to completion of the weld.

(d) Discontinue the endwise force applied to the work members A and B after the platen has traveled a predetermined distance to complete the weld.

The apparatus provided to achieve this automatic cycle includes the sliding cage 200 carried on the stationary guide rails 201 mounted on the end member 13. A rod 202 connected to the cage 200 by means of the terminal fitting 203 extends loosely through an apertured abutment 204 fixed on the moving platen 15 and is threaded to receive a nut 205. As the platen 15 is moved under hydraulic pressure of the main cylinder 16, the nut 205 engages the abutment 204 and causes the rod 202 to pull the cage 200 along the rails 201.

Micrometer devices 206, 207 and 208 are mounted on the cage 200 and each is adapted to cooperate with a stationary micro-switch 209, 210 and 211, respectively, mounted on the crossbar 212. When the abutting ends of the work pieces A and B are initially brought into pressure contact, and before the torch 31 is brought into operation, each of the micrometer devices 206, 207 and 208 is adjusted to zero. The threaded sleeve 213 of the micrometer device 206 is then adjusted relative to the stationary threaded stem 214 to produce the desired reading on the scale 215. This corresponds to the desired travel of the moving platen 15 before the halves of the torch 31 open to an inoperative position. Similarly, the sleeve 216 of the micrometer device 207 is adjusted relative to the stationary threaded stem 217 until the reading on the scale 218 corresponds to the desired travel of the moving platen 15 to the location where the initial high pressure on the weld is reduced to a lower pressure. In the same manner, the sleeve 219 of the micrometer device 208 is adjusted relative to the stationary threaded stem 220 until the reading on the scale 221 corresponds to the desired total travel of the moving platen 15 during the weld cycle; at that point the pressure is relaxed in the main cylinder 16 and the flame of the torch is extinguished. Shoulders 222, 223 and 224 on the micrometer devices 206, 207, 208, respectively, cooperate with the micro-switches 209, 210 and 211 to actuate the switches in accordance with the individual settings of the micrometer devices.

As shown in Fig. 35, the micro-switch 210 is electrically connected to reduce the pressure of fluid supplied to the main cylinder assembly 16. The micro-switch 209 is electrically connected to swing the torch halves 63 and 64 to open, retracted position. The micro-switch 211 is electrically connected to cut off the supply of hydraulic fluid to the main cylinder assembly 16, and also to cut off the supply of oxygen and acetylene to the torch halves 63 and 64.

The motor 225 drives the pump 226, and the discharge from the pump is connected to the pilot valve assembly 227. This, in turn, is connected to opposite ends of the main cylinder 16 through hydraulic connections 228 and 229. An electrically operated pilot valve 230 controls actuation of the four-way valve 227. When the parts of the valves 230 and 227 are in the position shown in Figure 35, both ends of the cylinder 16 are connected to the sump through the hydraulic lines 228, 229 and 231. When the solenoid 232 is energized, the pilot valve parts shift to the left, thereby causing the four-way-valve parts to shift to the right, resulting in delivery of fluid from the hydraulic line 229, thereby causing the piston 1 to move forward in a direction to apply pressure to the ends of the abutting work pieces. The hydraulic line 229 is then connected to the sump. Opposite ends of the main hydraulic cylinder 16 are connected through hydraulic lines 233 and 234 and check valves 235 and 236 to the hydraulic line 237. A needle valve 238 is mounted in this line and serves to control the rate of discharge of fluid from opposite ends of the cylinder.

When the solenoid 239 is energized, the pilot valve parts shift to the right, thereby causing the four-way valve parts to shift to the left, resulting in delivery of fluid from the pump to the hydraulic line 228, thereby causing the piston 1 to move rearward within the cylinder.

A pressure relief valve 240 is connected to the pump discharge line through pipe 241, and this relief valve is adjusted to limit the maximum pressure in the pump discharge line, thereby protecting the pump against overload. The line 242 connects the discharge side of the relief valve 240 to the solenoid operated valve 243. This latter valve is, in turn connected to the unloading valve 244. The position of the parts in the solenoid 243 as shown in Figure 35 corresponds to the position when the solenoid 245 is energized and, in this position, fluid flows from the relief valve 240 through the solenoid valve 243 and to the sump by way of the unloading valve 244. When the solenoid 245 is deenergized, the flow through the line 242 is cut off and hydraulic fluid does not pass through the unloading valve 244.

A second relief valve 246 is mounted in the pump discharge line and is adjusted to the same maximum pressure as relief valve 240. A line 247 connects the relief valve 246 with the solenoid operated valve 248 and the high pressure unloading valve 249. The solenoid operated valve 248 is, in turn, connected to the low pressure unloading valve 250 leading to the sump. The parts of the solenoid valve 247, as shown in Figure 35, correspond to the position when the solenoid 251 is energized and, in this position, hydraulic fluid in the line 247 passes through the solenoid valve 248 and is discharged to the sump through the low pressure unloading valve 250. The setting of this valve 250, therefore, regulates the pressure in the line 247 and in the line 252 downstream from the relief valve 246. When the solenoid 251 is deenergized, the parts of the valve 248 move to the right, thereby cutting off flow through the low pressure unloading valve 250. The setting of the high pressure unloading valve 249 then regulates the pressure in the lines 247 and 252.

The solenoid 251 is electrically connected to the micro-switch 210 so that, when the micro-switch closes the electrical circuit through the solenoid 251, the high pressure existing in lines 247 and 252 and in the hydraulic cylinder 16 is reduced to low pressure determined by the setting of the unloading valve 250. As set forth above, this reduction in pressure occurs upon predetermined movement of the platen 15, as determined by the setting of the micrometer device 207.

The micro-switch 211 is electrically connected to the solenoid 245 so that, when the micro-switch closes the electrical circuit through the solenoid 245, pressure in the lines 242 and 252 is dumped through the unloading valve 244 to the sump, thereby terminating the application of endwise pressure to the work pieces by means of the hydraulic cylinder assembly 16.

The micro-switch 211 is also electrically connected to shut off the supply of oxygen and acetylene to the torch halves 63 and 64. Oxygen is supplied through line 255 and acetylene is supplied through line 256. Both of these lines extend to the air-operated shut-off valve 257. When the parts of this valve are in the position shown in Figure 35, oxygen and acetylene are shut off by the valve and do not reach the torch halves 63 and 64. When the air valve 258 is actuated as described below to move the parts thereof to the left, air under pressure from line 259 is supplied through line 260 and air in line 261 is vented. This results in shifting of the parts of the shut-off valve 257 to the left. In this position, both halves 63 and 64 of the torch assembly receive oxygen and acetylene.

Air is supplied through pipe 262 and this pipe communicates with the solenoid-operated valve assembly 263. When the solenoid 264 is energized, the parts assume the position shown in the drawing, causing air to be vented from line 265. When the solenoid 266 is energized, the parts of the valve 263 move to the left to pressurize the line 265 and cause the air valve 258 to pressurize line 260, thereby delivering oxygen and acetylene to the torch halves 63 and 64.

The solenoid 264 is electrically connected to the micro-switch 211 so that, when the micro-switch 211 is closed after predetermined movement of the platen 15, the supply of oxygen and acetylene to the torch is cut off.

It is desirable to open the torch halves to retracted position prior to shutting off the supply of oxygen and acetylene, in order to avoid damage to the molten metal at the surface of the welded joint when the torch flame is extinguished. Accordingly, the opening of the torch halves is set to occur prior to the end of the weld cycle. Hydraulic pressure from a suitable source is delivered to the solenoid-operated four-way valve 265 through supply pipe 266. Line 267 connects the valve 265 to the forward ends of the cylinders 98 and 99. Line 268 connects the valve 265 with the rear ends of said cylinders. In the position of the parts as shown in the drawing, the valve 265 is closed and prevents hydraulic fluid from passing in either direction through the lines 267 and 268. When the solenoid 270 is energized, the parts of the valve 265 are moved to the right, thereby connecting the forward ends of the cylinders 98 and 99 with the source of hydraulic pressure, and the torch halves 63 and 64 assume the encircling or closed position shown in the drawing.

When the solenoid 271 is energized, the parts of the valve 265 are moved to the left, with the result that pressure fluid is supplied through line 268 to the rear ends of the cylinders 98 and 99 while line 267 is connected to the sump by way of the check valve 272. Pressurizing of the rear ends of the cylinders 98 and 99 results in swinging of the torch halves 63 and 64 to an open and inoperative position. The micro-switch 209 is electrically connected to the solenoid 270 so that opening of the torch halves occurs after predetermined travel of the moving platen 15, as determined by the setting of the micrometer device 206.

Operation

In the operation of the pressure welding machine, the fixed platen 17 is adjusted along the horizontal columns or tension bars 10, 11 and 12 to accommodate work pieces A and B which are to be welded end to end. The fixed platen 17 is then anchored in adjusted position by means of the split collars 19 engaging within certain of the grooves 18. The work support units 20 and 21 are then moved axially along the tension bars 10, 11 and 12 to bring them into proper position for engagement of the fingers 22 and 23 with the outer surfaces of the work pieces A and B. The adjusting screws 24 and 25 and their cooperating nuts are employed to connect the work support unit 20 to the moving platen 15 and to connect the work support unit 21 to the fixed platen 17. The torch carriage 104 is then shifted axially along the tension bars 10, 11 and 12 by means of the hydraulic motor 115 under control of the switch unit 180. The carriage 104 is moved to bring the work alignment guide 158 into position so that the saddle 166 is positioned to support one end of the work pieces A and B while the other end is connected to its respective gripping device 26 or 28. The work piece is then contacted by the fingers of the work support unit adjacent the work piece, and the saddle of the alignment guide is retracted by means of the power cylinder assembly 159. The fingers are actuated individually by supplying pressure fluid to the respective power cylinders 41 (see Figure 11).

The work alignment guide is then shifted to a position in which the saddle 166 underlies the forward end of the other work piece and holds it in a central position of alignment while the fingers on the other work support unit are brought into contact with the outer surface thereof. The work alignment guide is then retracted laterally to an inoperative position by means of the power cylinder assembly 99.

A sheet of paper is then placed between the abutting ends of the work pieces and endwise pressure is applied by means of the hydraulic cylinder assembly 16. The pressure is then released and the paper inspected visually to determine whether the abutting end surfaces have perfect contact characteristics. If not, one or both of the work pieces is removed from the machine to correct the end surface which is very carefully machined and treated to prevent oxidation. When the contact between the end surfaces of the work pieces A and B has been determined to be satisfactory, the micrometer devices 206, 207 and 208 are adjusted to cause a certain cycle of operations to occur at predetermined positions in the travel of the moving platen 15, as described above. The shut-off valve 257 (see Figure 35) is then opened to deliver oxygen and acetylene to the torch halves 63 and 64. The torch is ignited while the torch halves are in open, inoperative position. The torch halves are then closed and the ring of flame is directed against the abutting ends of the work pieces A and B. The hydraulic cylinder 16 applies an endwise force of relatively great magnitude to the work pieces. This force produces high unit pressure in the region of the end surfaces of the work pieces A and B and prevents opening of a crack or groove around the outer periphery of the joint to be welded under the external application of heat from the torch 31. The torch oscillates angularly through a short arc to assure even application of heat around the periphery of the joint. The torch also moves axially along the horizontal columns 10, 11 and 12 at a rate exactly one-half of the rate of travel of the moving platen 15, and this is accomplished through the action of the rack 114, gear 123, worm wheel 120 and screw 116.

When the moving platen has traveled through a predetermined distance, the micro-switch 210 reduces the high unit pressure applied to the hydraulic cylinder assembly 15 and the remainder of the welding cycle takes place at lower pressure. Shortly before the end of the weld cycle, the micro-switch 209 is actuated to open the torch halves 63 and 64 and swing them to an inoperative position away from the welded joint. Shortly thereafter the micro-switch 211 is actuated, thereby terminating the delivery of hydraulic fluid to the main hydraulic cylinder 16, and cutting off the supply of oxygen and acetylene to the torch halves 63 and 64.

At the end of the weld cycle, the welded joint has the general appearance shown in Figure 7. After the welded parts have been removed from the machine, the internal and external upsets in the vicinity of the weld may be removed so that the parts have the appearance shown in Figure 7a.

Having fully described our invention, it is to be understood that we do not wish to be limited to the details set forth, but our invention is of the full scope of the appended claims.

We claim:

1. Pressure welding apparatus of the class described, comprising in combination: a frame, relatively movable work support units mounted on the frame, a heating torch assembly positioned between the work support units, a carriage movable along the frame supporting the torch assembly, a longitudinal gear rack fixed relative to one of the work support units, a rotatable screw extending parallel to the gear rack and held against axial movement with respect to the other work support unit, means for rotating the screw, a gear rotatably mounted on the carriage and meshing with the gear rack, a worm wheel rotatably mounted on the carriage co-axially of the gear and engaging the screw, the axis of the gear and worm wheel passing between the gear rack and the screw, and clutch means for establishing a driving connection between the gear and the worm wheel, whereby longitudinal movement of the gear rack causes the worm wheel to roll along the screw thereby to move the carriage one-half the relative distance of travel of said work support units for all relative movement thereof, whereby said carriage maintains a position midway between said work support units.

2. Pressure welding apparatus of the class described, comprising in combination: a frame, relatively movable work support units mounted for longitudinal movement along the frame, a heating torch assembly positioned between the work support units, a carriage movable along the frame supporting the torch assembly, a longitudinal gear rack fixed relative to one of the work support units, a rotatable screw extending parallel to the gear rack and held against axial movement with respect to the other work support unit, means for rotating the screw, a transverse shaft rotatably mounted on the carriage and positioned between the screw and the gear rack, a gear on the shaft meshing with the gear rack, a worm wheel on the shaft engaging the screw, and clutch means for establishing a driving connection between the gear and the worm wheel, whereby on disengagement of said clutch and rotation of said screw the position of said carriage is shifted relative to said gear rack, and whereby on engagement of said clutch and movement of said gear rack said carriage is moved one-half the distance of said gear rack and work support unit connected therewith, thereby tending to maintain said carriage in a mid-position between said work support units.

3. Pressure welding apparatus of the class described, comprising in combination: a frame, relatively movable work support units mounted for longitudinal movement along the frame, a heating torch assembly positioned between the work support units, a carriage movable along the frame supporting the torch assembly, a longitudinal gear rack fixed relative to one of the work support units, a rotatable screw extending parallel to and below the gear rack and held against axial movement with respect to the other work support unit, means for rotating the screw, a gear rotatably mounted on the carriage below the gear rack and meshing therewith, a worm wheel rotatably mounted on the carriage coaxially of the gear above the screw and meshing therewith, and clutch means for establishing a driving connection between the gear and the worm wheel, whereby on disengagement of said clutch and rotation of said screw the position of said carriage is shifted relative ot said gear rack, and whereby on engagement of said clutch and movement of said gear rack said carriage is moved one-half the distance of said gear rack and work support unit connected therewith, thereby tending to maintain said carriage in a mid-position between said work support units.

4. Pressure welding apparatus of the class described, comprising in combination: a frame, relatively movable work support units mounted for longitudinal movement along the frame, a heating torch assembly positioned between the work support units, a carriage movable along the frame supporting the torch assembly, a longitudinal gear rack fixed relative to one of the work support units and slidably guided on the carriage, a rotatable screw extending parallel to the gear rack and held against axial movement with respect to the other work support unit, means for rotating the screw, a transverse shaft rotatably mounted on the carriage and positioned between the gear rack and the screw, a spur gear fixed on the shaft and meshing with the gear rack, a worm wheel rotatably mounted on the shaft engaging the screw, and clutch means for establishing a driving connection between the gear and the shaft, whereby on disengagement of said clutch and rotation of said screw the position of said carriage is shifted relative to said gear rack, and whereby on engagement of said clutch and movement of said gear rack said carriage is moved one-half the distance of said gear rack and work support unit connected therewith, thereby tending to maintain said carriage in a mid-position between said work support units.

5. Pressure welding apparatus of the class described, comprising in combination: a frame, a work support unit movable longitudinally along said frame, adjustable work-engaging fingers carried upon said work support unit and adapted to support a piece having a longitudinal axis, means for moving each finger toward and away from the work piece in a plane containing said axis, said means including a pivotal support for the finger, a power cylinder assembly including a piston mounted to move in a cylinder and having a piston rod connected to actuate said finger, a nut threadedly mounted upon the piston rod and engageable with the cylinder to limit travel of the piston rod, and means for turning said nut relative to the piston rod.

6. Pressure welding apparatus of the class described, comprising in combination: a frame, a work support unit movable longitudinally along said frame, adjustable work-engaging fingers carried upon said work support unit and adapted to support a piece having a longitudinal axis, means for moving each finger toward and away from the work piece in a plane containing said axis, said means including a pivotal support for the finger, a power cylinder assembly including a piston mounted to move in a cylinder and having a piston rod connected to actuate said finger, a nut threadedly mounted upon the piston rod and engageable with the cylinder to limit travel of the piston rod, the nut having gear teeth provided on the outer surface thereof, a driving gear meshing with the gear teeth on the nut and permitting axial movement of the nut, and means for turning said gear.

7. In a pressure welding apparatus having means for chucking a pair of work pieces to be joined, means for forcing said work pieces together, and means for welding said work pieces together, of a work piece aligning means for each work piece, comprising: a frame structure slidable along said work piece; a plurality of finger levers pivotally connected to said frame structure and adapted to converge axially toward said work piece for engagement therewith adjacent the region to be welded; a power unit for pivoting each finger including a connecting rod joined thereto; adjustable stop means for limiting the travel of each rod thereby to adjust individually the work piece engaging position of each finger lever and thereby center said work piece with respect to a selected axis; remote control means for operating said adjustable stops; and means for operating said power units simultaneously to move said finger levers between their adjusted positions and a retracted position.

References Cited in the file of this patent

UNITED STATES PATENTS

| | | |
|---|---|---|
| 734,808 | Brown | July 28, 1903 |
| 979,909 | Williamson | Dec. 27, 1910 |
| 1,586,139 | Bivins | May 25, 1926 |

(Other references on following page)

UNITED STATES PATENTS

| | | |
|---|---|---|
| 2,047,305 | Bell | July 14, 1936 |
| 2,054,375 | Halle | Sept. 15, 1936 |
| 2,061,287 | Muehl | Nov. 17, 1936 |
| 2,350,716 | Bissout et al. | June 6, 1944 |
| 2,352,885 | Bukowsky | July 4, 1944 |
| 2,376,765 | Forbes | May 22, 1945 |
| 2,392,824 | Lytle et al. | Jan. 15, 1946 |
| 2,439,246 | Gibian | Apr. 6, 1948 |
| 2,441,150 | Jenkins | May 11, 1948 |
| 2,459,068 | Eastwood | Jan. 11, 1949 |
| 2,462,498 | Himoff et al. | Feb. 22, 1949 |
| 2,585,266 | Murray et al. | Feb. 12, 1952 |
| 2,634,633 | Smith | Apr. 14, 1953 |
| 2,684,222 | Miller | July 20, 1954 |
| 2,684,603 | Schonberg | July 27, 1954 |
| 2,765,136 | Knapp | Oct. 2, 1956 |